United States Patent
Hayase et al.

(10) Patent No.: US 11,398,056 B2
(45) Date of Patent: Jul. 26, 2022

(54) IMAGE DIFFERENCE DETERINATION DEVICE AND METHOD THAT DETERMINES WHETHER OR NOT THERE IS A TEMPORARY DIFFERENCE BETWEEN IMAGES AND NON-TRANSITORY COMPUTER-READABLE MEDIUM

(71) Applicant: NIPPON TELEGRAPH AND TELEPHONE CORPORATION, Tokyo (JP)

(72) Inventors: Kazuya Hayase, Yokosuka (JP); Tokinobu Mitasaki, Yokosuka (JP); Atsushi Shimizu, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 107 days.

(21) Appl. No.: 16/467,321

(22) PCT Filed: Dec. 12, 2017

(86) PCT No.: PCT/JP2017/044536
§ 371 (c)(1),
(2) Date: Jun. 6, 2019

(87) PCT Pub. No.: WO2018/110541
PCT Pub. Date: Jun. 21, 2018

(65) Prior Publication Data
US 2020/0066000 A1  Feb. 27, 2020

(30) Foreign Application Priority Data

Dec. 13, 2016  (JP) .............................. JP2016-241301
Dec. 13, 2016  (JP) .............................. JP2016-241305
Dec. 20, 2016  (JP) .............................. JP2016-246899

(51) Int. Cl.
*G06T 7/00* (2017.01)

(52) U.S. Cl.
CPC .............. *G06T 7/97* (2017.01); *G06T 7/0002* (2013.01); *G06T 2207/10032* (2013.01)

(58) Field of Classification Search
None
See application file for complete search history.

(56) References Cited

U.S. PATENT DOCUMENTS

2002/0047936 A1*  4/2002  Tojo ....................... G06V 20/40
                                                          348/700
2005/0074141 A1    4/2005  Tsunashima
(Continued)

FOREIGN PATENT DOCUMENTS

JP    2005-070985 A    3/2005
JP    2011-133341 A    7/2011
(Continued)

OTHER PUBLICATIONS

Jian Wang et al: "Flashlight Scene Detection for MPEG Videos"—Published in: 2005 IEEE 7th Workshop on Multimedia Signal Processing—Oct. 30, 2005—pp. 1-4 (https://ieeexplore.ieee.org/stamp/stamp.jsp?tp=&arnumber=4013948) (Year: 2005).*
(Continued)

*Primary Examiner* — Mohammad H Ghayour
*Assistant Examiner* — Pawan Dhingra
(74) *Attorney, Agent, or Firm* — Harness, Dickey & Pierce, P.L.C.

(57) ABSTRACT

An image difference determination device includes a determination result acquisition unit configured to acquire a result of determining whether or not there is a difference between time-series images when there are at least three time-series images and a speed determination unit configured to determine that the difference between the time-series images is caused by a change of a prescribed speed or less when it is determined that there is a difference between images at both (Continued)

ends of a time series in which it is determined that there is no difference between images adjacent in the time series.

5 Claims, 23 Drawing Sheets

(56) References Cited

U.S. PATENT DOCUMENTS

| | | | |
|---|---|---|---|
| 2010/0128977 A1 | 5/2010 | Yagyuu | |
| 2012/0070034 A1* | 3/2012 | Xiao | G06K 9/6296 382/103 |
| 2012/0120237 A1 | 5/2012 | Trepess | |
| 2016/0065990 A1* | 3/2016 | Shimizu | H04N 19/176 375/240.12 |
| 2019/0272439 A1* | 9/2019 | Mitasaki | H04N 5/92 |

FOREIGN PATENT DOCUMENTS

| | | |
|---|---|---|
| JP | 2012-221164 A | 11/2012 |
| JP | 2013-239011 A | 11/2013 |
| JP | 2014-086913 A | 5/2014 |
| JP | 2015-026369 A | 2/2015 |
| WO | WO-2012074352 A1 | 6/2012 |

OTHER PUBLICATIONS

Di Zhong: "Segmentation, Index and Summarization of Digital Video Content"—Published in: Dec. 2001—Columbia University, pp. 1-177—( https://www.ee.columbia.edu/In/dvmm/publications/PhD_theses/dzhong-thesis.pdfjian%20wang%20flash%20light) (Year: 2001).*

Notice of Allowance (in English and Japanese) issued in Japanese Application No. 2018/556685, dated Apr. 2, 2019.

International Search Report (in English and Japanese) issued in International Application No. PCT/JP2017/044536, dated Feb. 20, 2018; ISA/JP.

Cernekova, Z. et al., "Temporal Video Segmentation By Graph Partitioning", Acoustics, Speech And Signal Processing, 2006. ICASSP 2006 Proceedings. 2006 IEEE International Conference On Toulouse, France May 14-19, 2006, Piscataway, NJ, USA, IEEE, Piscataway, NJ, USA, May 14, 2006, p. II, XP031330998, ISBN: 978-1-4244-0469-8.

Partial Supplementary European Search Report from counterpart EP178806279, dated May 26, 2020.

* cited by examiner

FIG. 27

| | DETERMINATION DATA TABLE | |
|---|---|---|
| 31ST CONDITION / 32ND CONDITION | THERE IS NO DIFFERENCE BETWEEN ALL IMAGES ADJACENT IN TIME SERIES | BETWEEN ADJACENT IMAGES IN TIME SERIES, THERE ARE IMAGE(S) HAVING DIFFERENCE AND IMAGE(S) HAVING NO DIFFERENCE. | THERE ARE DIFFERENCES BETWEEN ALL IMAGES ADJACENT IN TIME SERIES |
| THERE IS NO DIFFERENCE BETWEEN IMAGES THAT ARE NOT ADJACENT IN TIME SERIES | POSSIBILITY OF ERROR IS LOW | POSSIBILITY OF ERROR IS HIGH | DETERMINATION OF POSSIBILITY OF ERROR IS IMPOSSIBLE |
| THERE IS DIFFERENCE BETWEEN IMAGES THAT ARE NOT ADJACENT IN TIME SERIES | POSSIBILITY OF ERROR IS HIGH | POSSIBILITY OF ERROR IS LOW | DETERMINATION OF POSSIBILITY OF ERROR IS IMPOSSIBLE |

IMAGE DIFFERENCE DETERINATION DEVICE AND METHOD THAT DETERMINES WHETHER OR NOT THERE IS A TEMPORARY DIFFERENCE BETWEEN IMAGES AND NON-TRANSITORY COMPUTER-READABLE MEDIUM

CROSS-REFERENCE TO RELATED APPLICATIONS

This application is a 371 U.S. National Phase of International Application No. PCT/JP2017/044536, filed on Dec. 12, 2017, which claims priority to Japanese Application No. 2016-241301, filed on Dec. 13, 2016, Japanese Application No. 2016-241305, filed on Dec. 13, 2016, and Japanese Application No. 2016-246899, filed on Dec. 20, 2016. The entire disclosures of the above applications are incorporated herein by reference.

TECHNICAL FIELD

The present invention relates to an image difference determination device and method, a change period estimation device and method, and a program.

BACKGROUND ART

There is a technique of determining whether or not there is a difference between time-series images in which substantially the same spatial region is imaged (see Patent Document 1). A difference between time-series images occurs in accordance with movement, change, or the like of a physical object in a spatial region of an imaging object. As a technique of detecting whether or not there is movement of a physical object in time-series images, similarity of motion vectors may be used (see Patent Document 2). In these techniques, even if a difference between time-series images is detected, a type of change to which the difference belongs in a spatial region is not determined.

CITATION LIST

Patent Literature

[Patent Document 1]
  Japanese Unexamined Patent Application, First Publication No. 2014-86913
[Patent Document 2]
  Japanese Unexamined Patent Application, First Publication No. 2012-221164

SUMMARY OF INVENTION

Technical Problem

In view of the above-described circumstances, an objective of the present invention is to provide an image difference determination device and method, a change period estimation device and method, and a program for determining a type of change to which a difference between time-series images belongs in a spatial region photographed in the time-series images.

Solution to Problem

According to a $1^{st}$ aspect of the present invention, there is provided an image difference determination device including: a determination result acquisition unit configured to acquire a result of determining whether or not there is a difference between time-series images when there are at least three time-series images; and a speed determination unit configured to determine that the difference between the time-series images is caused by a change of a prescribed speed or less when it is determined that there is a difference between images at both ends of a time series in which it is determined that there is no difference between images adjacent in the time series.

According to a $2^{nd}$ aspect of the present invention, in the image difference determination device according to the above-described $1^{st}$ aspect, the determination result acquisition unit is configured to acquire a result of determining whether or not there is a difference between small images of regions of the time-series images, and the speed determination unit is configured to determine that the difference between the small images of the regions of the time-series images is caused by a change of a prescribed speed or less when it is determined that there is a difference between the small images of the regions of the images at both ends of the time series in which it is determined that there is no difference between the small images of the regions of the images adjacent in the time series.

According to a $3^{rd}$ aspect of the present invention, in the image difference determination device according to the above-described $1^{st}$ aspect, the speed determination unit is configured to determine that the difference between the time-series images is caused by a temporary change when it is determined that there is no difference between the images at both ends of the time series in which it is determined that there is a difference between the images adjacent in the time series.

According to a $4^{th}$ aspect of the present invention, the image difference determination device according to any one of the above-described $1^{st}$ to $3^{rd}$ aspects further includes a difference determination unit configured to determine whether or not there is a difference between the time-series images with respect to a region of at least a part within an image.

According to a $5^{th}$ aspect of the present invention, there is provided an image difference determination device including: a determination result acquisition unit configured to acquire a result of determining whether or not there is a difference between an object image selected from time-series images and a reference image that is an image other than the object image among the time-series images; and a temporary difference determination unit configured to determine whether or not the object image has a temporary difference on the basis of a result of comparing the number of reference images determined to have differences from the object image with the number of reference images determined not to have differences from the object image.

According to a $6^{th}$ aspect of the present invention, in the image difference determination device according to the above-described $5^{th}$ aspect, the temporary difference determination unit is configured to designate a ratio of the number of reference images determined to have the differences from the object image to the total number of reference images among the time-series images as the comparison result.

According to a $7^{th}$ aspect of the present invention, in the image difference determination device according to the above-described $5^{th}$ aspect, the temporary difference determination unit is configured to designate a ratio of the number of regions within the reference images including small images determined to have differences from a small image of a region within the object image to the total number of regions within the reference images among the time-series images as the comparison result.

According to an 8th aspect of the present invention, the image difference determination device according to the above-described 6th or 7th aspect further includes a removal unit configured to remove an image having the temporary change from the time-series images on the basis of a magnitude relationship between the ratio and a threshold value.

According to a 9th aspect of the present invention, the image difference determination device according to any one of the above-described 5th to 8th aspects further includes a first difference determination unit configured to determine whether or not there is a difference between the object image and the reference image.

According to a 10th aspect of the present invention, in the image difference determination device according to any one of the above-described 5th to 9th aspects, the temporary difference determination unit is configured to select an image of a late imaging clock time and an image of an early imaging clock time as the reference images from the time-series images before it is determined whether or not the object image has the temporary difference.

According to an 11th aspect of the present invention, there is provided a change period estimation device including: an acquisition unit configured to acquire the presence or absence of a change in substantially the same space between time-series images configured from a plurality of images obtained by imaging substantially the same space; and an estimation unit configured to estimate a period during which substantially the same space changes on the basis of the presence or absence of a change in substantially the same space acquired by the acquisition unit.

According to a 12th aspect of the present invention, in the change period estimation device according to the above-described 11th aspect, the presence or absence of a change in substantially the same space acquired by the acquisition unit is the presence or absence of a change between at least three images of the time-series images and the estimation unit is configured to estimate a period during which substantially the same space changes in the at least three images.

According to a 13th aspect of the present invention, there is provided an image difference determination method to be executed by an image difference determination device for determining whether or not a difference between time-series images is caused by a change of a prescribed speed or less, the image difference determination method including the steps of: acquiring a result of determining whether or not there is a difference between the time-series images when there are at least three time-series images; and determining that the difference between the time-series images is caused by the change of the prescribed speed or less when it is determined that there is a difference between images at both ends of a time series in which it is determined that there is no difference between images adjacent in the time series.

According to a 14th aspect of the present invention, there is provided an image difference determination method to be executed by an image difference determination device for determining whether or not there is a temporary difference between images, the image difference determination method including the steps of: acquiring a result of determining whether or not there is a difference between an object image selected from time-series images and a reference image that is an image other than the object image among the time-series images; and determining whether or not the object image has a temporary difference on the basis of a result of comparing the number of reference images determined to have differences from the object image with the number of reference images determined not to have differences from the object image.

According to a 15th aspect of the present invention, there is provided a change period estimation method including: an acquisition step of acquiring the presence or absence of a change in substantially the same space between time-series images configured from a plurality of images obtained by imaging substantially the same space; and an estimation step of estimating a period during which substantially the same space changes on the basis of the presence or absence of a change in substantially the same space acquired in the acquisition step.

According to a 16th aspect of the present invention, there is provided a program for causing a computer to function as the image difference determination device according to any one of the above-described 1st to 10th aspects or the change period estimation device according to the above-described 11th or 12th aspect.

According to a 17th aspect of the present invention, there is provided an image difference determination device including: a determination result acquisition unit configured to acquire a result of determining whether or not there is a difference between time-series images; and a possibility determination unit configured to determine a possibility of the error of the determination result on the basis of whether or not there is an inconsistency in the determination result when there is no difference between any images adjacent in a time series among the time-series images.

According to an 18th aspect of the present invention, in the image difference determination device of the above-described 17th aspect, the possibility determination unit is configured to determine that the possibility of the error of the determination result is less than a threshold value when it is determined that there is no difference between all images adjacent in the time series and it is determined that there is also no difference between images that are not adjacent in the time series among the time-series images.

According to a 19th aspect of the present invention, in the image difference determination device of the above-described 17th aspect, the possibility determination unit is configured to determine that the possibility of the error of the determination result is greater than a threshold value when there are images for which it is determined that there is no difference between images adjacent in the time series and images for which it is determined that there is a difference therebetween among the time-series images and it is determined that there is no difference between images that are not adjacent in the time series.

According to a 20th aspect of the present invention, in the image difference determination device of the above-described 17th aspect, the possibility determination unit is configured to determine that the possibility of the error of the determination result is greater than a threshold value when it is determined that there is no difference between all images adjacent in the time series among the time-series images and it is determined that there is a difference between images that are not adjacent in the time series.

According to a 21st aspect of the present invention, in the image difference determination device of the above-described 17th aspect, the possibility determination unit is configured to determine that the possibility of the error of the determination result is less than a threshold value when there are images for which it is determined that there is no difference between images adjacent in the time series and images for which it is determined that there is a difference therebetween among the time-series images and it is determined that there is a difference between images that are not adjacent in the time series.

According to a 22$^{nd}$ aspect of the present invention, in the image difference determination device according to any one of the above-described 17$^{th}$ to 21$^{st}$ aspects, the determination result acquisition unit is configured to acquire a small image determination result that is a result of determining whether or not there is a difference between small images of regions of the time-series images and the possibility determination unit is configured to determine a possibility of an error of the small image determination result on the basis of whether or not there is an inconsistency in the small image determination result when there is no difference between small images of regions of any images adjacent in the time series among the time-series images.

According to a 23$^{rd}$ aspect of the present invention, there is provided an image difference determination method to be executed by an image difference determination device for determining a possibility of an error of a result of determining whether or not there is a difference between images, the image difference determination method including the steps of: acquiring a result of determining whether or not there is a difference between time-series images; and determining a possibility of an error of the determination result on the basis of whether or not there is an inconsistency in the determination result when there is no difference between any images adjacent in a time series among the time-series images.

Advantageous Effects of Invention

According to the present invention, it is possible to determine a type of change to which a difference between time-series images belongs in a spatial region photographed in the time-series images.

BRIEF DESCRIPTION OF DRAWINGS

FIG. 27 is a diagram showing an example of a determination data table in the sixth embodiment.

DESCRIPTION OF EMBODIMENTS

Embodiments of an image difference determination device and method, a change period estimation device and method, and a program of the present invention will be described in detail with reference to the drawings.

First Embodiment

Figure 1:
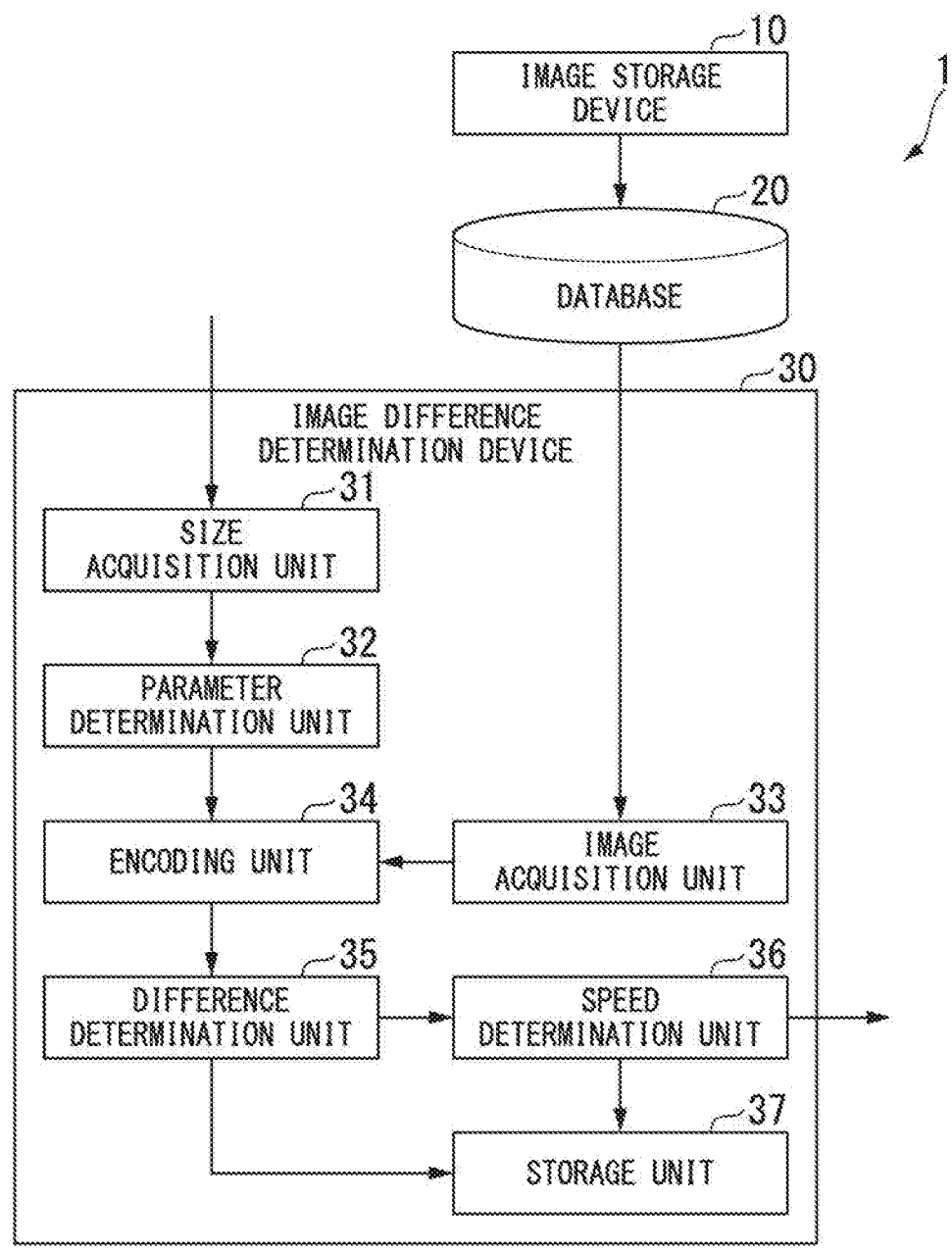
FIG. 1 is a diagram showing an example of a configuration of an image difference determination system in a first embodiment.

FIG. 1 is a diagram showing an example of a configuration of an image difference determination system 1. The image difference determination system 1 determines whether or not a difference between time-series images is caused by a change of a prescribed speed or less. The image difference determination system 1 includes an image storage device 10, a database 20, and an image difference determination device 30.

The image storage device 10 is an information processing device configured to store images in the database 20. The image storage device 10 performs a filtering process of sorting images that satisfy a quality standard desired by a user with predetermined accuracy on time-series images. The quality standard, for example, means that a spatial region having an area having a fixed proportion or more among spatial regions of an imaging object is imaged. For example, when the images are aerial images or satellite images, the quality standard means that a spatial region having an area having a fixed proportion or more is imaged without being hidden by clouds or fog. Substantially the same spatial region is imaged in the time-series images. The images are, for example, medical images, monitoring images, aerial images, or satellite images. The satellite images are, for example, obtained by imaging substantially the same spatial region on a ground surface from an artificial satellite at a frequency of about once per day. The image storage device 10 stores time-series images sorted in a filtering process in the database 20.

As another example, the quality standard may mean the ease of detection of a change in an imaging object between stored images. For example, a ratio of an area in which an imaging object is imaged to an area of an image may be used. It may be determined that the image satisfies the quality standard when a proportion of an area in which the imaging object appears without being hidden by another subject in the image is greater than or equal to a predetermined value. Furthermore, if the imaging object appears clearly in the image, it may be determined that the image satisfies the quality standard. That is, the quality standard may be defined with respect to the imaging object.

The database 20 includes a storage device having a non-volatile recording medium (a non-transitory recording medium) such as a magnetic hard disk device or a semiconductor storage device. The database 20 stores time-series images sorted according to a filtering process with prescribed accuracy. The time-series images stored by the database 20 satisfy a user-desired quality standard.

The images are divided into a plurality of regions (blocks) on the basis of a predetermined protocol. A shape of the region within the image is, for example, a rectangle. The region within the image is defined in an image in a unit of, for example, a macro block (MB) of the Moving Picture Experts Group (MPEG) or the like, a coding unit (CU) of high efficiency video coding (HEVC) or the like, a largest CU (LCU), a prediction unit (PU), or a transform unit (TU). Hereinafter, a case in which the regions are included in an image in units of LCUs will be described.

The image difference determination device 30 is an information processing device that determines whether or not there is a difference between time-series images. The image difference determination device 30 acquires the time-series images from the database 20. The image difference determination device 30 determines whether or not there is a difference between the time-series images acquired from the database 20. The image difference determination device 30 determines whether or not the difference between the time-series images stored in the database 20 is caused by a change of a prescribed speed or less. The image difference determination device 30 outputs a result of determining whether or not the difference between the time-series images is caused by the change of the prescribed speed or less to the outside of the image difference determination device 30.

The image difference determination device 30 includes a size acquisition unit 31, a parameter determination unit 32, an image acquisition unit 33, an encoding unit 34, a difference determination unit 35, a speed determination unit 36, and a storage unit 37. For example, some or all of the size acquisition unit 31, the parameter determination unit 32, the image acquisition unit 33, the encoding unit 34, the difference determination unit 35, and the speed determination unit 36 may be implemented by a processor such as a central processing unit (CPU) executing a program stored in the storage unit 37 or implemented using hardware such as a large scale integration circuit (LSI) or an application specific integrated circuit (ASIC).

The size acquisition unit 31 externally acquires information (hereinafter referred to as "determination size information") indicating the size of an object to be determined (hereinafter referred to as a "determination size") on an image. Hereinafter, the determination size indicates the size of the LCU. For example, the determination size is represented using the number of pixels. The size acquisition unit 31 transmits the determination size information to the parameter determination unit 32.

The parameter determination unit 32 at least determines encoding parameters including information indicating the size of the LCU (hereinafter referred to as an "encoding size") and the like on the basis of the determination size. The parameter determination unit 32 transmits the encoding parameters including the information indicating the encoding size and the like to the encoding unit 34.

The image acquisition unit 33 acquires time-series images from the database 20. For example, the image acquisition unit 33 acquires three or more time-series images. The image acquisition unit 33 transmits the time-series images to the encoding unit 34. Hereinafter, an image of an object for which it is determined whether or not there is a difference from the reference image is referred to as an "object image". The reference image is an image other than the object image among the time-series images. The time-series images are sorted into the object image and reference images by the image acquisition unit 33 or the difference determination unit 35 on the basis of a predetermined condition. The time-series images may be divided into the object image and the reference images and stored in the database 20.

The encoding unit 34 encodes the object image and the reference images. For example, the encoding unit 34 may execute a moving-image encoding process such as H.264/advanced video coding (AVC), HEVC, or MPEG on the basis of the encoding parameters. The encoding unit 34 may execute a still-image encoding process such as JPEG on the basis of the encoding parameters.

The encoding unit 34 encodes the object image and the reference images on the basis of a determination size. If the moving-image encoding process of HEVC is executed, the encoding unit 34 performs, for example, an intra-coding process of HEVC based on the determination size on the object image and the reference images.

Hereinafter, a LCU within the object image is referred to as an "object LCU". Hereinafter, the LCU adjacent to the object LCU in the object image is referred to as an "adjacent LCU". Hereinafter, a LCU spatially having substantially the same position as the object LCU in the reference image is referred to as the "same position LCU". Spatially substantially the same position may indicate a position of substantially the same coordinates in the image or a position of substantially the same latitude and longitude in the imaged spatial region. Hereinafter, an image in a region included in the image will be referred to as a "small image". Because regions correspond one-to-one to small images, the number of small images is equal to the number of regions.

The difference determination unit 35 determines whether or not there is a difference between a small image of a region of the object LCU and a small image of a region of an adjacent LCU on the basis of a difference between encoding information of the small image of the region of the object LCU and encoding information of the small image of the region of the adjacent LCU. For example, the difference determination unit 35 determines whether or not there is a difference between a small image of a region of the object LCU and a small image of a region of the adjacent LCU on the basis of a difference between the amount of coding bits of the region of the object LCU and the amount of coding bits of the region of the adjacent LCU.

When there is a difference between the small image of the region of the object LCU and the small image of the region of the adjacent LCU, the difference determination unit 35 further determines whether or not there is a difference between the small image of the region of the object LCU and the small image of the region of the same position LCU. The difference determination unit 35 determines whether or not there is a difference between the small image of the region of the object LCU and the small image of the region of the same position LCU on the basis of a difference between encoding information of the small image of the region of the object LCU and encoding information of the small image of the region of the same position LCU. For example, the difference determination unit 35 determines whether or not there is a difference between the small image of the region of the object LCU and the small image of the region of the adjacent LCU on the basis of a difference between the amount of coding bits of the region of the object LCU and the amount of coding bits of the region of the same position LCU.

A method in which the difference determination unit 35 determines whether or not there is a difference between the object image and the reference image is not limited to a specific method. Hereinafter, a method in which the difference determination unit 35 determines whether or not there is a difference between small images on the basis of the amount of coding bits in the encoding process will be described as an example.

The difference determination unit 35 compares the amount of coding bits of the region of the object LCU with the amount of coding bits of regions of adjacent LCUs on the top, bottom, left and right of the region of the object LCU. For example, the difference determination unit 35 determines whether or not a relationship between the amount of coding bits of the region of the object LCU and the amount of coding bits of the region of the adjacent LCU satisfies any one of the following first to eighth conditions.

$$\max(R(N-1)/R(N), R(N)/R(N-1)) > R\_Th1 \quad \text{First condition:}$$

$$\max(R(N+1)/R(N), R(N)/R(N+1)) > R\_Th1 \quad \text{Second condition:}$$

$$\max(R(N-x)/R(N), R(N)/R(N-x)) > R\_Th1 \quad \text{Third condition:}$$

$$\max(R(N+x)/R(N), R(N)/R(N+x)) > R\_Th1 \quad \text{Fourth condition:}$$

$$\min(R(N-1)/R(N), R(N)/R(N-1)) < R\_Th2 \quad \text{Fifth condition:}$$

$$\min(R(N+1)/R(N), R(N)/R(N+1)) < R\_Th2 \quad \text{Sixth condition:}$$

$$\min(R(N-x)/R(N), R(N)/R(N-x)) < R\_Th2 \quad \text{Seventh condition:}$$

$$\min(R(N+x)/R(N), R(N)/R(N+x)) < R\_Th2 \quad \text{Eighth condition:}$$

Here, the term "R" denotes the amount of coding bits of the region of the LCU. The term "max(R(N−1), R(N))" denotes a larger value between the amount of coding bits R(N−1) and R(N). The term "min(R(N−1), R(N))" represents a smaller value between the amount of coding bits R(N−1) and R(N). The term "R_Th1" is a threshold value of the amount of coding bits that satisfies R_Th1>1. The term "R_Th2" is a threshold value of the amount of coding bits that satisfies 0<R_Th2≤1. The term "N" denotes an $N^{th}$ object LCU within the object image. The term "N−1" denotes the adjacent LCU on the left of the object LCU. The term "N+1" denotes the adjacent LCU on the right of the object LCU. The term "N−x" denotes the adjacent LCU on the top of the object LCU. The term "N+x" denotes the adjacent LCU on the bottom of the object LCU.

If the relationship between the amount of coding bits of the region of the object LCU and the amount of coding bits of the region of the adjacent LCU does not satisfy any one of the first to eighth conditions, the difference determination unit 35 determines that there is no difference between the small image of the region of the object LCU and the small image of the region of the adjacent LCU. That is, if the difference between the amount of coding bits of the region of the object LCU and the amount of coding bits of the region of the adjacent LCU is small, the difference determination unit 35 determines that there is no difference between the small image of the region of the object LCU and the small image of the region of the adjacent LCU. The difference determination unit 35 records a result of determining that there is no difference between the small image of the region of the object LCU and the small image of the region of the adjacent LCU in the storage unit 37 in association with the region of the object LCU.

If the relationship between the amount of coding bits of the region of the object LCU and the amount of coding bits of the region of the adjacent LCU satisfies any one of the first to eighth conditions, the difference determination unit 35 compares the amount of coding bits of the region of the object LCU with the amount of coding bits of the region of the same position LCU. For example, the difference determination unit 35 determines whether or not the relationship between the amount of coding bits of the region of the object LCU and the amount of coding bits of the region of the same position LCU satisfies the following ninth or tenth condition.

$$\max(R\_A(N)/R\_B(N), R\_B(N)/R\_A(N)) > R\_Th3 \quad \text{Ninth condition:}$$

$$\min(R\_A(N)/R\_B(N), R\_B(N)/R\_A(N)) < R\_Th4 \quad \text{Tenth condition:}$$

Here, the term "R_A" denotes the amount of coding bits of a region of the same position LCU within a reference image "A". The term "R_B" denotes the amount of coding bits of a region of an object LCU within an object image "B". The term "R_Th3" is a threshold value of the amount of coding bits that satisfies R_Th3>1. The term "R_Th4" is a threshold value of the amount of coding bits that satisfies 0<R_Th4≤1.

If the relationship between the amount of coding bits of the region of the object LCU and the amount of coding bits of the region of the same position LCU does not satisfy either one of the ninth condition and the tenth condition, the difference determination unit 35 determines that there is no difference between the small image of the region of the object LCU and the small image of the region of the same position LCU. That is, if the difference between the amount of coding bits of the region of the object LCU and the amount of coding bits of the region of the same position LCU is small, the difference determination unit 35 determines that there is no difference between the small image of the region of the object LCU and the small image of the region of the same position LCU. The difference determination unit 35 records a result of determining that there is no difference between the small image of the region of the object LCU and the small image of the region of the same position LCU in the storage unit 37 in association with the region of the object LCU.

If the relationship between the amount of coding bits of the region of the object LCU and the amount of coding bits of the region of the same position LCU satisfies the ninth condition or the tenth condition, the difference determination unit 35 determines that there is a difference between the small image of the region of the object LCU and the small image of the region of the same position LCU. That is, if a difference between the amount of coding bits of the region of the object LCU and the amount of coding bits of the region of the same position LCU is large, the difference determination unit 35 determines that there is a difference between the small image of the region of the object LCU and the small image of the region of the same position LCU. The difference determination unit 35 records a determination result indicating that it has been determined that there is a difference between the small image of the region of the object LCU and the small image of the region of the same position LCU in the storage unit 37 in association with the region of the object LCU.

If the encoding unit 34 executes a moving-image encoding process of HEVC, the difference determination unit 35 may calculate a result of determining whether or not there is a difference between small images when encoding has been performed by shifting an encoding start point defined at an upper left end of an image. The difference determination unit 35 may define a result of combining a determination result when encoding has been performed without shifting an encoding start point and a determination result when encoding has been performed by shifting an encoding start point (a logical OR result) as a final determination result.

Figure 2:
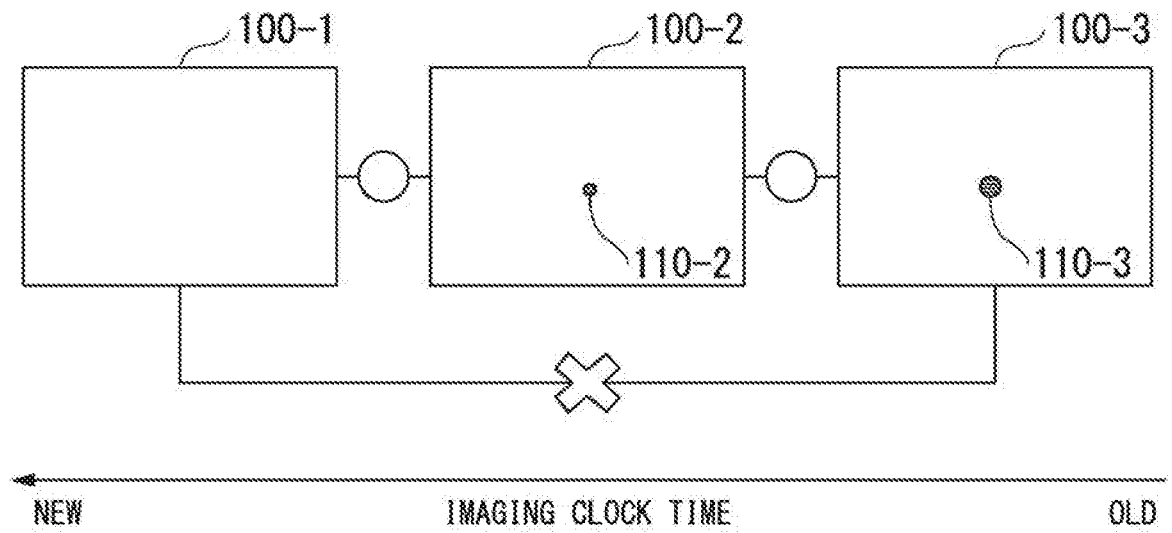
FIG. 2 is a diagram showing a first example of time-series images in the first embodiment.

FIG. 2 is a diagram showing a first example of time-series images in the first embodiment. In FIG. 2, images 100 encoded by the encoding unit 34 are schematically represented using images 100 before encoding is performed. Images 100-1 to 100-3 are time-series images. The image 100-1 has the latest imaging clock time. The image 100 includes a subject image 110. For example, when the images 100 are aerial images or satellite images, the subject image 110 shows a planimetric feature such as a river, a coastline, a mountain, a tree, or a building. In the example shown in FIG. 2, an area of a subject image 110-2 is smaller than an area of a subject image 110-3.

If determination size information is externally acquired, the conventional image difference determination device can determine whether or not there is a difference smaller than a determination size between images that are exactly the same except for a very small region within the image. However, because the actual time-series images are not exactly the same, it is not possible to determine whether or not there is a difference smaller than the determination size even if the conventional image difference determination device externally acquires the determination size information. Even if the determination size information is externally acquired, the conventional image difference determination device cannot determine whether or not a small difference between the time-series images is caused by a change of a prescribed speed or less. On the other hand, the image difference determination device 30 of the first embodiment can determine whether or not the small difference between the time-series images is caused by the change of the prescribed speed or less on the basis of an inconsistency in a result of determining whether or not there is a small difference according to the fact that actual time-series images are not exactly the same.

Also, although an example in which the number of time-series images is three will be described in FIGS. 2 and 3, the image difference determination device 30 can determine whether or not the difference between the time-series images is caused by the change of the prescribed speed or less when the number of time-series images is three or more. The prescribed speed is determined in accordance with an interval between imaging clock times of the time-series images. For example, when the interval between the imaging clock times is substantially one day, the difference caused by the change of the prescribed speed or less is a difference caused by a change of an interval of substantially one day or less. For example, when the interval between the imaging clock times has a length from about one day to two days, the difference caused by the change of the prescribed speed or less may be a difference caused by a change in an average interval between the imaging clock times of the time-series images.

In the example shown in FIG. 2, the difference determination unit 35 determines whether or not there is a difference between images adjacent in a time series for each image. The difference determination unit 35 determines whether or not there is a difference between images at both ends of a time series in which it is determined that there is no difference between images adjacent in the time series. When the number of time-series images is N (N is an integer of 3 or more), the difference determination unit 35 determines a difference between time-series images N times.

In the example shown in FIG. 2, the difference determination unit 35 selects images serving as object images one by one from the images 100-1 to 100-3. The difference determination unit 35 determines that there is no difference between the image 100-1 selected as an object image and the image 100-2 that is a reference image. A circle mark between the images in FIG. 2 indicates that it has been determined that there is no difference between the images. The difference determination unit 35 determines that there is no difference between the image 100-2 selected as an object image and the image 100-3 that is a reference image.

The difference determination unit 35 determines that there is a difference between the image 100-3 selected as an object image and the image 100-1 that is a reference image with respect to the images 100-1 and 100-3 at both ends of the time series in which it is determined that there is no difference between images adjacent in the time series. A cross mark between the images in FIG. 2 indicates that it has been determined that there is a difference between the images.

Figure 3:
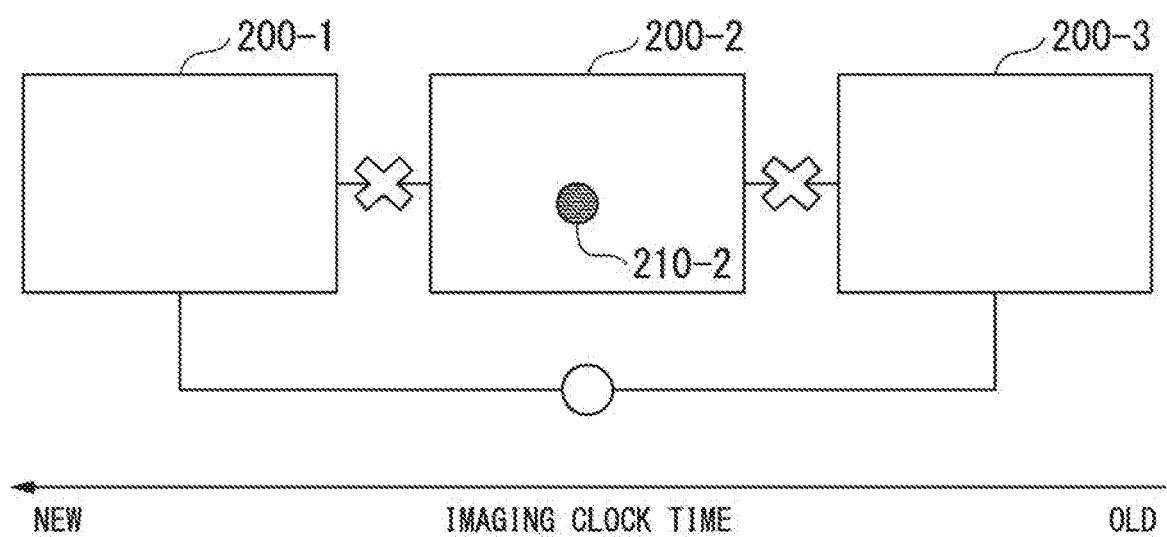
FIG. 3 is a diagram showing a second example of time-series images in the first embodiment.

FIG. 3 is a diagram showing a second example of time-series images in the first embodiment. In the example shown in FIG. 3, images 200 encoded by the encoding unit 34 are schematically represented using images 200 before encoding is performed. Images 200-1 to 200-3 are the time-series images. The image 200-1 has the latest imaging clock time. The images 200 include a subject image 210. For example, when the images 200 are aerial images or satellite images, the subject image 210 shows a planimetric feature such as a river, a coastline, a mountain, a tree, or a building.

In the example shown in FIG. 3, the difference determination unit 35 selects images serving as object images one by one from the images 200-1 to 200-3. The difference determination unit 35 determines that there is a difference between the image 200-1 selected as an object image and the image 200-2 that is a reference image. A cross mark between the images in FIG. 3 indicates that it has been determined that there is a difference between the images. The difference determination unit 35 determines that there is a difference between the image 200-2 selected as an object image and the image 200-3 that is a reference image.

The difference determination unit 35 determines that there is no difference between the image 200-3 selected as an object image and the image 200-1 that is a reference image with respect to the images 200-1 and 200-3 at both ends of the time series in which it is determined that there is a difference between images adjacent in the time series. A circle mark between the images in FIG. 3 indicates that it has been determined that there is no difference between the images.

Figure 4:
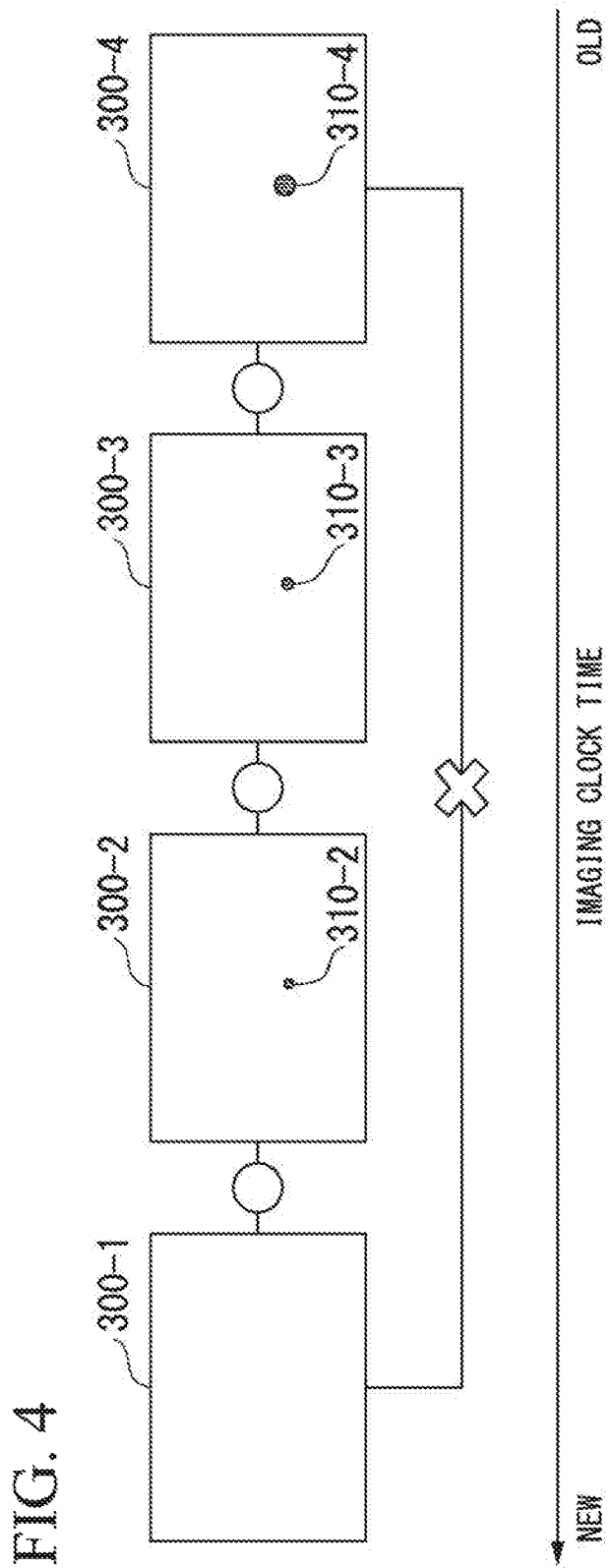
FIG. 4 is a diagram showing a third example of time-series images in the first embodiment.

FIG. 4 is a diagram showing a third example of time-series images in the first embodiment. In FIG. 4, images 300 encoded by the encoding unit 34 are schematically represented using images 300 before encoding is performed. Images 300-1 to 300-4 are the time-series images. The image 300-1 has the latest imaging clock time. The image 300 includes a subject image 310. For example, when the images 300 are aerial images or a satellite images, the subject image 310 shows a planimetric feature such as a river, a coastline, a mountain, a tree, or a building. In the example shown in FIG. 4, an area of a subject image 310-2 is smaller than an area of a subject image 310-3. The area of the subject image 310-3 is smaller than an area of a subject image 310-4.

In the example shown in FIG. 4, the difference determination unit 35 selects images serving as object images one by one from the images 300-1 to 300-4. The difference determination unit 35 determines that there is no difference between the image 300-1 selected as an object image and the image 300-2 that is a reference image. A circle mark between the images in FIG. 4 indicates that it has been determined that there is no difference between the images. The difference determination unit 35 determines that there is no difference between the image 300-2 selected as an object image and the image 300-3 that is a reference image. The difference determination unit 35 determines that there is no difference between the image 300-3 selected as an object image and the image 300-4 that is a reference image.

The difference determination unit 35 determines that there is a difference between the image 300-4 selected as an object image and the image 300-1 that is a reference image with respect to the images 300-1 and 300-4 at both ends of the time series in which it is determined that there is no difference between images adjacent in the time series. A cross mark between the images in FIG. 4 indicates that it has been determined that there is a difference between the images.

Figure 5:
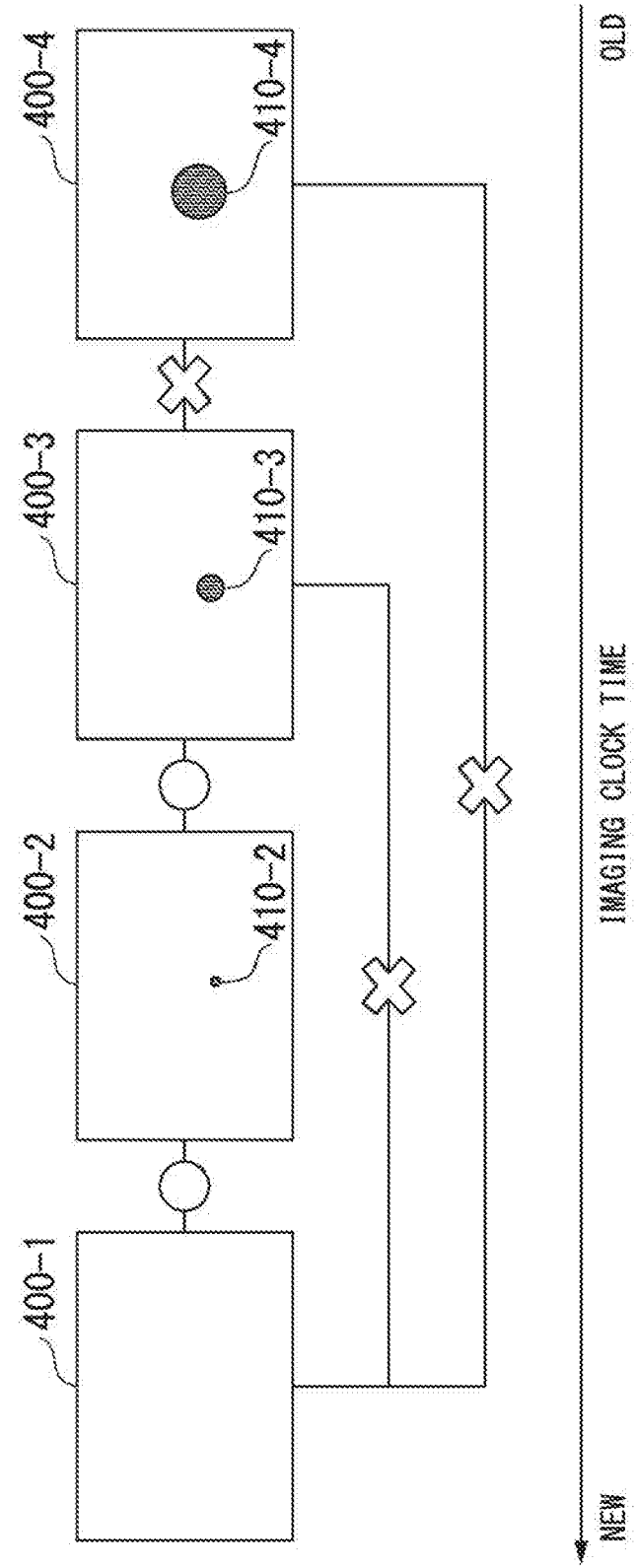
FIG. 5 is a diagram showing a fourth example of time-series images in the first embodiment.

FIG. 5 is a diagram showing a fourth example of time-series images in the first embodiment. In FIG. 5, images 400 encoded by the encoding unit 34 are schematically represented using images 400 before encoding is performed. Images 400-1 to 400-4 are the time-series images. The image 400-1 has the latest imaging clock time. The image 400 includes a subject image 410. For example, when the images 400 are aerial images or satellite images, the subject image 410 shows a planimetric feature such as a river, a coastline, a mountain, a tree, or a building. In the example shown in FIG. 5, an area of a subject image 410-2 is smaller than an area of a subject image 410-3. The area of the subject image 410-3 is smaller than an area of a subject image 410-4.

In the example shown in FIG. 5, the difference determination unit 35 selects images serving as object images one by one from the images 400-1 to 400-4. The difference determination unit 35 determines that there is no difference between the image 400-1 selected as an object image and the image 400-2 that is a reference image. A circle mark between the images in FIG. 5 indicates that it has been determined that there is no difference between the images. The difference determination unit 35 determines that there is no difference between the image 400-2 selected as an object image and the image 400-3 that is a reference image. The difference determination unit 35 determines that there is a difference between the image 400-3 selected as an object image and the image 400-4 that is a reference image. A cross mark between the images in FIG. 5 indicates that it has been determined that there is a difference between the images.

The difference determination unit 35 determines that there is a difference between the image 400-1 selected as an object image and the image 400-3 that is a reference image with respect to the images 400-1 and 400-3 at both ends of the time series in which it is determined that there is no difference between the images adjacent in the time series. Also, the difference determination unit 35 determines that there is a difference between the image 400-4 selected as an object image and the image 400-1 that is a reference image with respect to the images 400-1 and 400-4 at both ends of the time series.

Returning to FIG. 1, the description of the configuration of the image difference determination device 30 will be continued. The speed determination unit 36 determines whether or not a difference between the images at both ends of the time series in which it is determined that there is no difference between images adjacent in the time series is caused by a change of a prescribed speed or less. For example, when it is determined that there is a difference between images at both ends of the time series in which it is determined that there is no difference between images adjacent in the time series, the speed determination unit 36 determines that the difference between the time-series images is caused by the change of the prescribed speed or less.

In the example shown in FIG. 2, there is no difference between images 100-1 and 100-2 adjacent in the time series. There is no difference between images 100-2 and 100-3 adjacent in the time series. On the other hand, there is a difference between the images 100-1 and 100-3 at both ends of the time series. That is, there is an inconsistency in the presence or absence of a difference between time-series images. Therefore, the speed determination unit 36 determines that the difference between the image 100-1 and the image 100-3 is caused by the change of the prescribed speed or less.

The speed determination unit 36 records information indicating that the difference between the time-series images is caused by the change of the prescribed speed or less in the storage unit 37. The speed determination unit 36 outputs the information indicating that the difference between the time-series images is caused by the change of the prescribed speed or less to the outside of the image difference determination device 30.

Also, in the example shown in FIG. 2, when it is determined that there is no difference between the images 100-1 and 100-3 at both ends of the time series, the speed determination unit 36 determines that there is no difference between all of the images 100-1 to 100-3.

When it is determined that there is a difference between images adjacent in a time series and there is no difference between the images at both ends of the time series, the speed determination unit 36 determines that the difference between the time-series images is caused by a temporary change. In the example shown in FIG. 3, there is a difference between the images 200-1 and 200-2 adjacent in the time series. There is a difference between images 200-2 and 200-3 adjacent in the time series. There is no difference between the images 200-1 and 200-3 at both ends of the time series. Therefore, the speed determination unit 36 determines that the difference between the time-series images is caused by the temporary change.

The speed determination unit 36 records information indicating that the difference between the time-series images is caused by the temporary change in the storage unit 37. The speed determination unit 36 outputs the information indicating that the difference between the time-series images is caused by the temporary change to the outside of the image difference determination device 30.

Also, in the example shown in FIG. 3, when it is determined that there is a difference between the images 200-1 and 200-3 at both ends of the time series, the speed determination unit 36 determines that there are differences between all of the images 200-1 to 200-3.

In the example shown in FIG. 4, because there is no difference between images adjacent in the time series, the speed determination unit 36 determines whether or not a difference between the images 300-1 and 300-4 at both ends of the time series in which it is determined that there is no difference between images adjacent in the time series is caused by a change of a prescribed speed or less. Even though there is no difference between the image 300-1 and the image 300-2, there is no difference between the image 300-2 and the image 300-3, and there is no difference between the image 300-3 and the image 300-4, the speed determination unit 36 determines that the difference between the images 300-1 and 300-4 is caused by the change of the prescribed speed or less because there is a difference between the image 300-1 and the image 300-4.

The speed determination unit 36 may determine whether or not the difference between the images is caused by the change of the prescribed speed or less with respect to some of the time-series images. In the example shown in FIG. 5, because there is a difference between the image 400-3 and the image 400-4 adjacent to each other in the time series, the speed determination unit 36 determines whether or not a difference between the images 400-1 and 400-3 at both ends of a line of the images 400-1, 400-2, and 400-3 in which it is determined that there is no difference between images adjacent in the time series is caused by the change of the prescribed speed or less. Even though there is no difference between the image 400-1 and the image 400-2 and there is no difference between the image 400-2 and the image 400-3, the speed determination unit 36 determines that the difference between the images 400-1 and 400-3 is caused by the change of the prescribed speed or less because there is a difference between the image 400-1 and the image 400-3.

Returning to FIG. 1, the description of the configuration of the image difference determination device 30 will be continued. The storage unit 37 includes a storage device having a nonvolatile recording medium (a non-transitory recording medium) such as a magnetic hard disk device or a semiconductor storage device. The storage unit 37 stores a determination result from the difference determination unit 35. The storage unit 37 stores information about a change. For example, the storage unit 37 stores information indicating that the difference between the time-series images is caused by the change of the prescribed speed or less.

Figure 6:
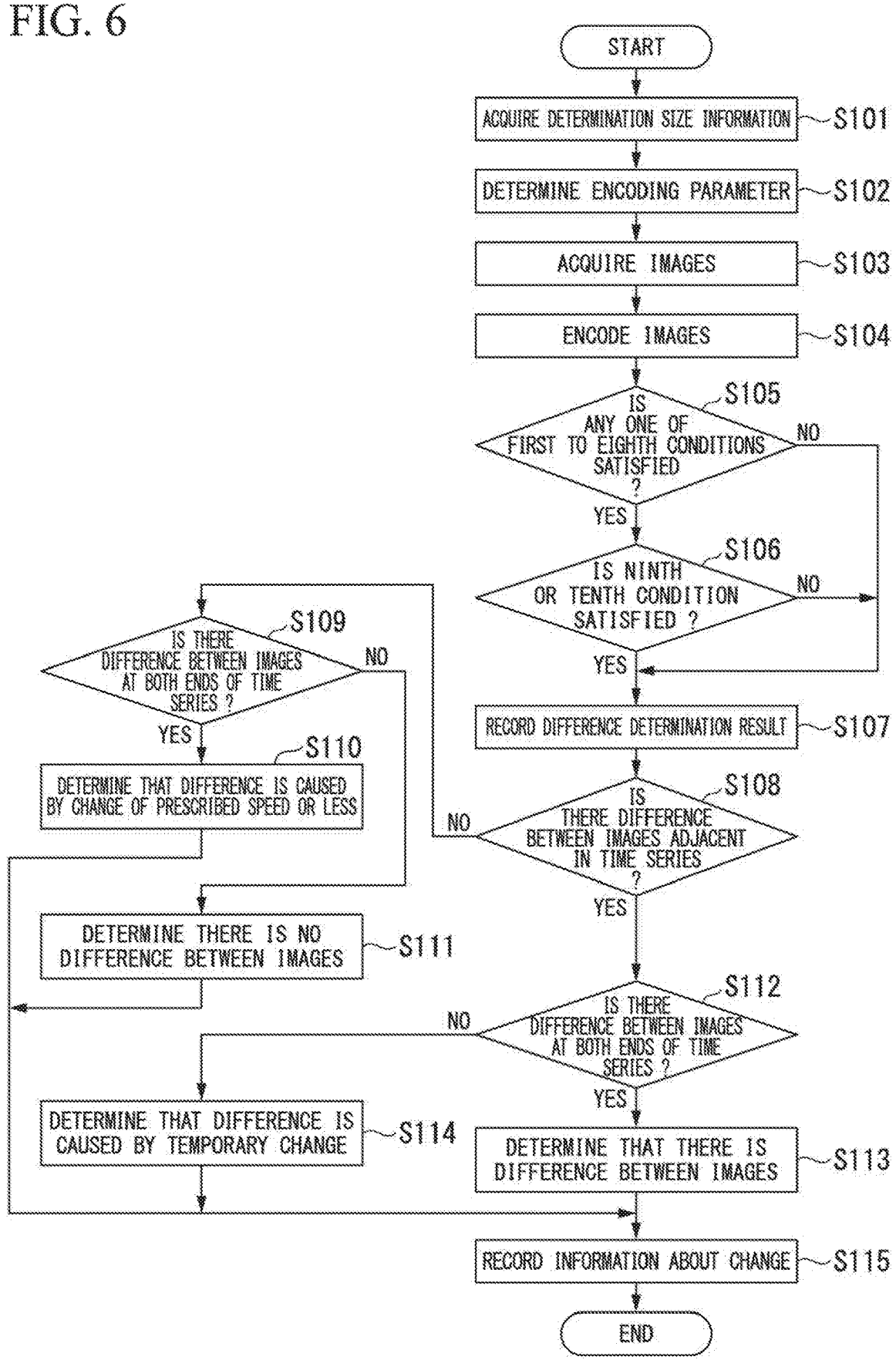
FIG. 6 is a flowchart showing an example of an operation of the image difference determination system in the first embodiment.

FIG. 6 is a flowchart showing an example of the operation of the image difference determination system 1. The size acquisition unit 31 acquires determination size information (step S101). The parameter determination unit 32 determines at least an encoding parameter, such as an encoding size, on the basis of the determination size (step S102). The image acquisition unit 33 acquires time-series images from the database 20 (step S103). The encoding unit 34 encodes the time-series images (step S104).

The difference determination unit 35 determines whether or not a relationship between the amount of coding bits of the region of the object LCU and the amount of coding bits of the region of the adjacent LCU satisfies any one of the first to eighth conditions (step S105). When the relationship between the amount of coding bits of the region of the object LCU and the amount of coding bits of the region of the adjacent LCU does not satisfy any one of the first to eighth conditions (step S105: NO), the difference determination unit 35 moves the process to step S107 so that a determination result indicating that it has been determined that there is no difference between the small image of the region of the object LCU region and the small image of the region of the adjacent LCU is recorded in the storage unit 37.

When the relationship between the amount of coding bits of the region of the object LCU and the amount of coding bits of the region of the adjacent LCU satisfies any one of the first to eighth conditions (step S105: YES), the difference determination unit 35 determines whether or not the relationship between the amount of coding bits of the region of the object LCU and the amount of coding bits of the region of the same position LCU satisfies the ninth or tenth condition (step S106).

When the relationship between the amount of coding bits of the region of the object LCU and the amount of coding bits of the region of the same position LCU does not satisfy either one of the ninth condition and the tenth condition (step S106: NO), the difference determination unit 35 records a determination result indicating that it has been determined that there is no difference between the small image of the region of the object LCU region and the small image of the region of the same position LCU in the storage unit 37.

When the relationship between the amount of coding bits of the region of the object LCU and the amount of coding bits of the region of the same position LCU satisfies the ninth condition or the tenth condition (step S106: YES), the difference determination unit 35 records a determination result indicating that it has been determined that there is a difference between the small image of the region of the object LCU and the small image of the region of the same position LCU in the storage unit 37. In the first embodiment, the difference determination unit 35 determines the reference image for which it is determined that there is a difference between the small image of the region of the object image and the small image of the region of the reference image as a reference image having a difference from the object image (step S107). Operations of steps S105 to S107 are performed for each of the regions (the object LCUs) in object images selected sequentially from the time-series images.

The speed determination unit 36 determines whether or not there is a difference between images adjacent in the time series (step S108). When it is determined that there is no difference between images adjacent in the time series (step S108: NO), the speed determination unit 36 determines whether or not there is a difference between images at both ends of the time series in which it is determined that there is no difference between images adjacent in the time series (step S109).

If it is determined that there is a difference between the images at both ends of the time series in which it is determined that there is no difference between the images adjacent in the time series (step S109: YES), the speed determination unit 36 determines that difference between the images at both ends of the time series is caused by the change of the prescribed speed or less (step S110). If it is determined that there is no difference between the images at both ends of the time series in which it is determined that there is no difference between the images adjacent in the time series (step S109: NO), the speed determination unit 36 determines that there is no difference between the time-series images (step S111).

When it is determined that there is a difference between images adjacent in a time series (step S108: YES), the speed determination unit 36 determines whether or not there is a difference between the images at both ends of the time series in which it is determined that there is a difference between the images adjacent in the time series (step S112). If it is determined that there is a difference between the images at both ends of the time series in which it is determined that there is a difference between the images adjacent in the time series (step S112: YES), the speed determination unit 36 determines that there are differences between all of the time-series images (step S113). If it is determined that there is no difference between the images at both ends of the time series in which it is determined that there is a difference between the images adjacent in the time series (step S112: NO), the speed determination unit 36 determines that the difference between the time-series images is caused by the temporary change (step S114). The speed determination unit 36 records information about the change in the storage unit 37 (step S115).

As described above, the image difference determination device 30 of the first embodiment includes the speed determination unit 36. As a determination result acquisition unit that acquires the determination result, the speed determination unit 36 acquires a result of determining whether or not there is a difference between the time-series images. The time-series images are at least three images. When it is determined that there is a difference between images at both ends of the time series in which it is determined that there is no difference between the images adjacent in the time series, the speed determination unit 36 determines that the difference between the time-series images is caused by the change of the prescribed speed or less.

Thereby, the image difference determination device 30 of the first embodiment can determine whether or not the difference between the time-series images is caused by the change of the prescribed speed or less. For example, when the images are aerial images or satellite images, the image difference determination device 30 of the first embodiment can determine whether or not there is a difference caused between time-series images due to a change in an area of imaged reclaimed land.

Second Embodiment

A second embodiment is different from the first embodiment in that the speed determination unit 36 determines whether or not a difference between small images is caused by a change of a prescribed speed or less. In the second embodiment, only differences from the first embodiment will be described.

A difference determination unit 35 of the second embodiment determines whether or not there is a difference between small images of regions of images adjacent in a time series for each region of the image. The difference determination unit 35 determines whether or not there is a difference between small images of regions of images at both ends of the time series in which it is determined that there is no difference between the small images of the regions of the images adjacent in the time series.

Figure 7:
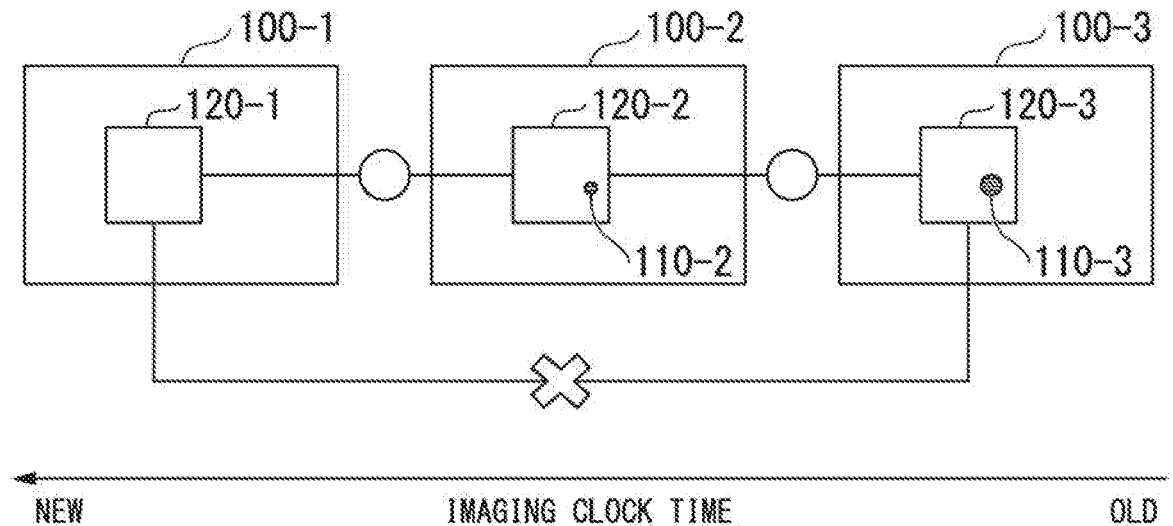
FIG. 7 is a diagram showing a first example of time-series images in a second embodiment.

FIG. 7 is a diagram showing a first example of time-series images in the second embodiment. In FIG. 7, images 100 encoded by an encoding unit 34 are schematically represented using images 100 before encoding is performed. The image 100 includes a region 120. The image 100 may include a subject image 110 in the region 120. In the example shown in FIG. 7, the difference determination unit 35 determines that there is no difference between a small image of a region 120-1 of an image 100-1 selected as an object image and a small image of a region 120-2 of an image 100-2 that is a reference image. Likewise, the difference determination unit 35 determines whether or not there is a difference between small images with respect to the small images of the regions 120 of the other images 100.

Figure 8:
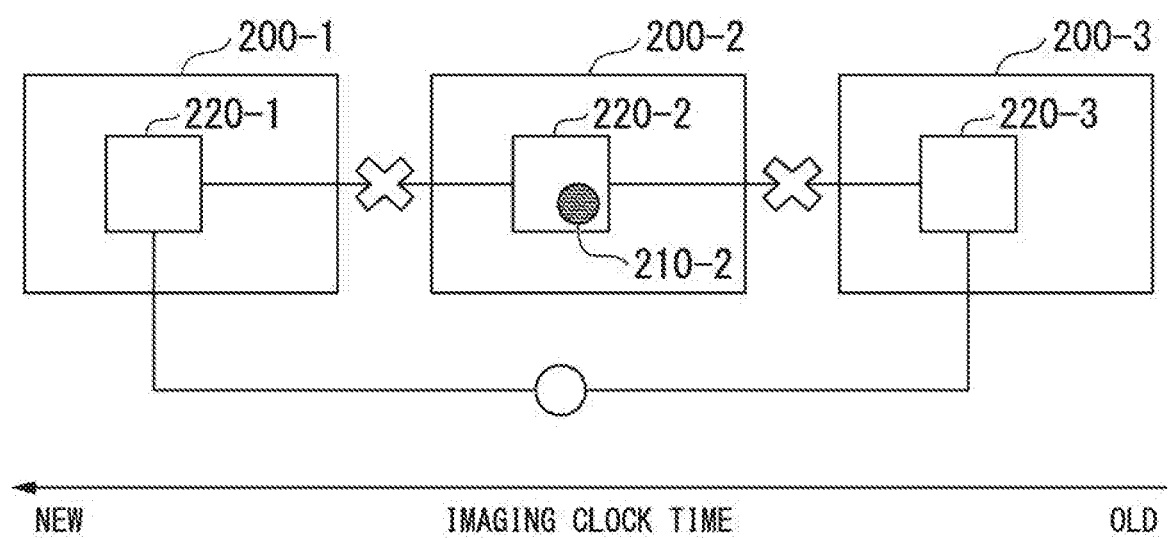
FIG. 8 is a diagram showing a second example of time-series images in the second embodiment.

FIG. 8 is a diagram showing a second example of time-series images in the second embodiment. In FIG. 8, images 200 encoded by the encoding unit 34 are schematically represented using images 200 before encoding is performed. Each image 200 includes a region 220. Each image 200 may include a subject image 210 in the region 220. In the example shown in FIG. 8, the difference determination unit 35 determines that there is a difference between a small image of a region 220-1 of an image 200-1 selected as an object image and a small image of a region 220-2 of an image 200-2 that is a reference image. Likewise, the difference determination unit 35 determines whether or not there is a difference between small images with respect to the small images of the regions 220 of the other images 200.

Figure 9:
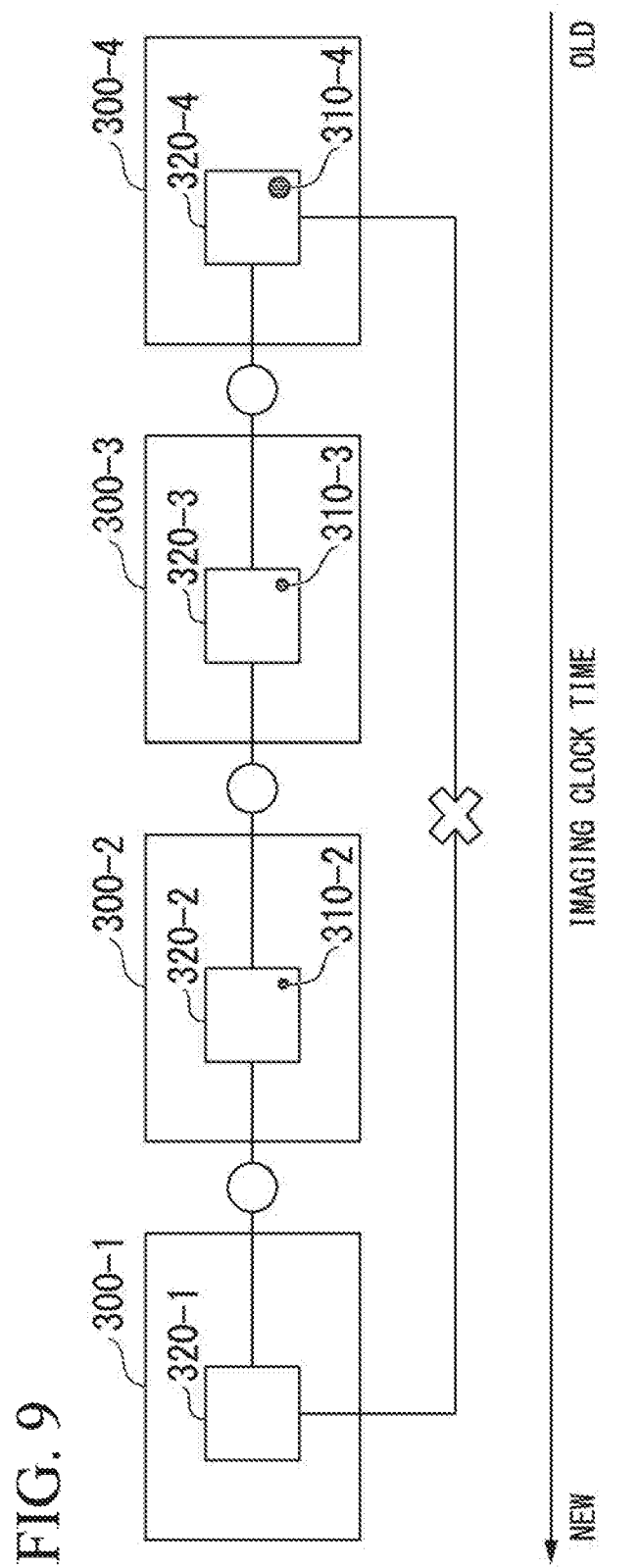
FIG. 9 is a diagram showing a third example of time-series images in the second embodiment.

FIG. 9 is a diagram showing a third example of time-series images in the second embodiment. In FIG. 9, images 300 encoded by the encoding unit 34 are schematically represented using images 300 before encoding is performed. Each image 300 includes a region 320. Each image 300 may include a subject image 310 in the region 320. In the example shown in FIG. 9, the difference determination unit 35 determines that there is no difference between a small image of a region 320-1 of an image 300-1 selected as an object image and a small image of a region 320-2 of an image 300-2 that is a reference image. Likewise, the difference determination unit 35 determines whether or not there is a difference between small images with respect to the small images of the regions 320 of the other images 300.

Figure 10:
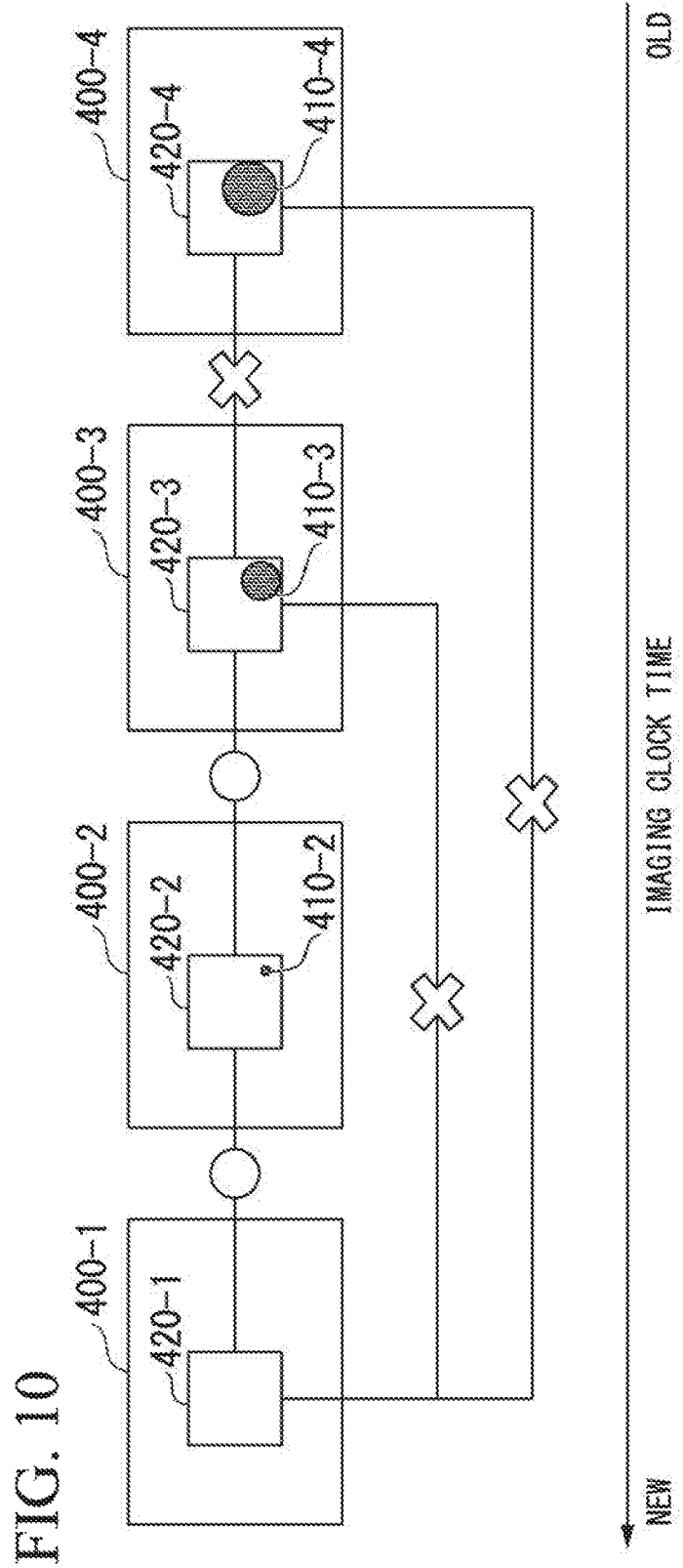
FIG. 10 is a diagram showing a fourth example of time-series images in the second embodiment.

FIG. 10 is a diagram showing a fourth example of time-series images in the second embodiment. In FIG. 10, images 400 encoded by the encoding unit 34 are schematically represented using images 400 before encoding is performed. Each image 400 includes a region 420. Each image 400 may include a subject image 410 in the region 420. In the example shown in FIG. 10, the difference determination unit 35 determines that there is no difference between a small image of a region 420-1 of an image 400-1 selected as an object image and a small image of a region 420-2 of an image 400-2 that is a reference image. Likewise, the difference determination unit 35 determines whether or not there is a difference between small images with respect to small images of the regions 420 of the other images 400.

The speed determination unit 36 of the second embodiment determines whether or not a difference between small images of regions of images at both ends of the time-series images in which it is determined that there is no difference between small images of regions of images adjacent in the time series is a difference caused by a change of a prescribed speed or less. For example, when it is determined that there is a difference between the small images of the regions of the images at both ends of the time series in which it is determined that there is no difference between the small images of the regions of the images adjacent in the time series, the speed determination unit 36 determines that the difference between the small images of the regions of the time-series images is caused by the change of the prescribed speed or less.

In the example shown in FIG. 7, there is no difference between a small image of a region 120-1 and a small image of a region 120-2 between an image 100-1 and an image 100-2 adjacent in a time series. There is no difference between the small image of the region 120-2 and a small image of a region 120-3 between the image 100-2 and an image 100-3 adjacent in the time series. On the other hand, there is a difference between the small image of the region 120-1 and the small image of the region 120-3 between the images 100-1 and 100-3 at both ends of the time series. That is, there is an inconsistency in the presence or absence of a difference between the small images of the regions in the time-series images. Therefore, the speed determination unit 36 determines that the difference between the small image of the region 120-1 of the image 100-1 and the small image of the region 120-3 of the image 100-3 is caused by the change of the prescribed speed or less.

The speed determination unit 36 records information indicating that the difference between the small images of the regions of the time-series images is caused by the change of the prescribed speed or less in the storage unit 37. The speed determination unit 36 outputs the information indicating that the difference between the small images of the regions of the time-series images is caused by the change of the prescribed speed or less to the outside of the image difference determination device 30.

Also, in the example shown in FIG. 7, when it is determined that there is no difference between the small image of the region 120-1 of the image 100-1 and the small image of the region 120-3 of the image 100-3, the speed determination unit 36 determines that there is no difference between small images in all the images 100-1 to 100-3.

When it is determined that there is a difference between small images of regions of images adjacent in the time series and there is no difference between small images of regions of images at both ends of the time series, the speed determination unit 36 determines that a difference between small images of regions of the time-series images is caused by the temporary change. In the example shown in FIG. 8, there is a difference between a small image of a region 220-1 and a small image of a region 220-2 between an image 200-1 and an image 200-2 adjacent in the time series. There is a difference between the small image of the region 220-2 and the small image of the region 220-3 between the image 200-2 and the image 200-3 adjacent in the time series. There is no difference between the small image of the region 220-1 and the small image of the region 220-3 between the images 200-1 and 200-3 at both ends of the time series. Therefore, the speed determination unit 36 determines that the difference between the small images of the regions of the time-series images is caused by the temporary change.

The speed determination unit 36 records information indicating that the difference between the small images of the regions of the time-series images is caused by the temporary change in the storage unit 37. The speed determination unit 36 outputs the information indicating that the difference between the small images of the regions of the time-series images is caused by the temporary change to the outside of the image difference determination device 30.

Also, in the example shown in FIG. 8, when it is determined that there is a difference between the small image of the region 220-1 of the image 200-1 and the small image of the region 220-3 of the image 200-3 at both ends of the time series, the speed determination unit 36 determines that there are differences between small images in all the images 200-1 to 200-3.

In the example shown in FIG. 9, because there is no difference between the small images of the regions of the images adjacent in the time series, the speed determination unit 36 determines whether or not a difference between small images of an image 300-1 and an image 300-4 at both ends of the time series in which it is determined that there is no difference between small images of regions of images adjacent in the time series is a difference caused by a change of a prescribed speed or less. Although the speed determination unit 36 determines that there is no difference between the small images of the images 300-1 and 300-2, there is no difference between the small images of the images 300-2 and 300-3, and there is no difference between the small images of the images 300-3 and the images 300-4, the speed determination unit 36 determines that a difference between the small images of the images 300-1 and the image 300-4 is caused by the change of the prescribed speed or less because there is a difference between the small images of the images 300-1 and the image 300-4.

In the example shown in FIG. 10, because there is a difference between the small images of the images 400-3 and 400-4 adjacent in the time series, the speed determination unit 36 determines whether or not a difference between small images of an image 400-1 and an image 400-3 at both ends of the time series in which it is determined that there is no difference between small images of regions of images adjacent in the time series is a difference caused by the change of the prescribed speed or less. Even though there is no difference between small images of the image 400-1 and the image 400-2 and there is no difference between small images of the image 400-2 and the image 400-3, the speed determination unit 36 determines that a difference between the small images of the image 400-1 and the image 400-3 is caused by the change of the prescribed speed or less because there is a difference between small images of the image 400-1 and the image 400-3.

Figure 11:
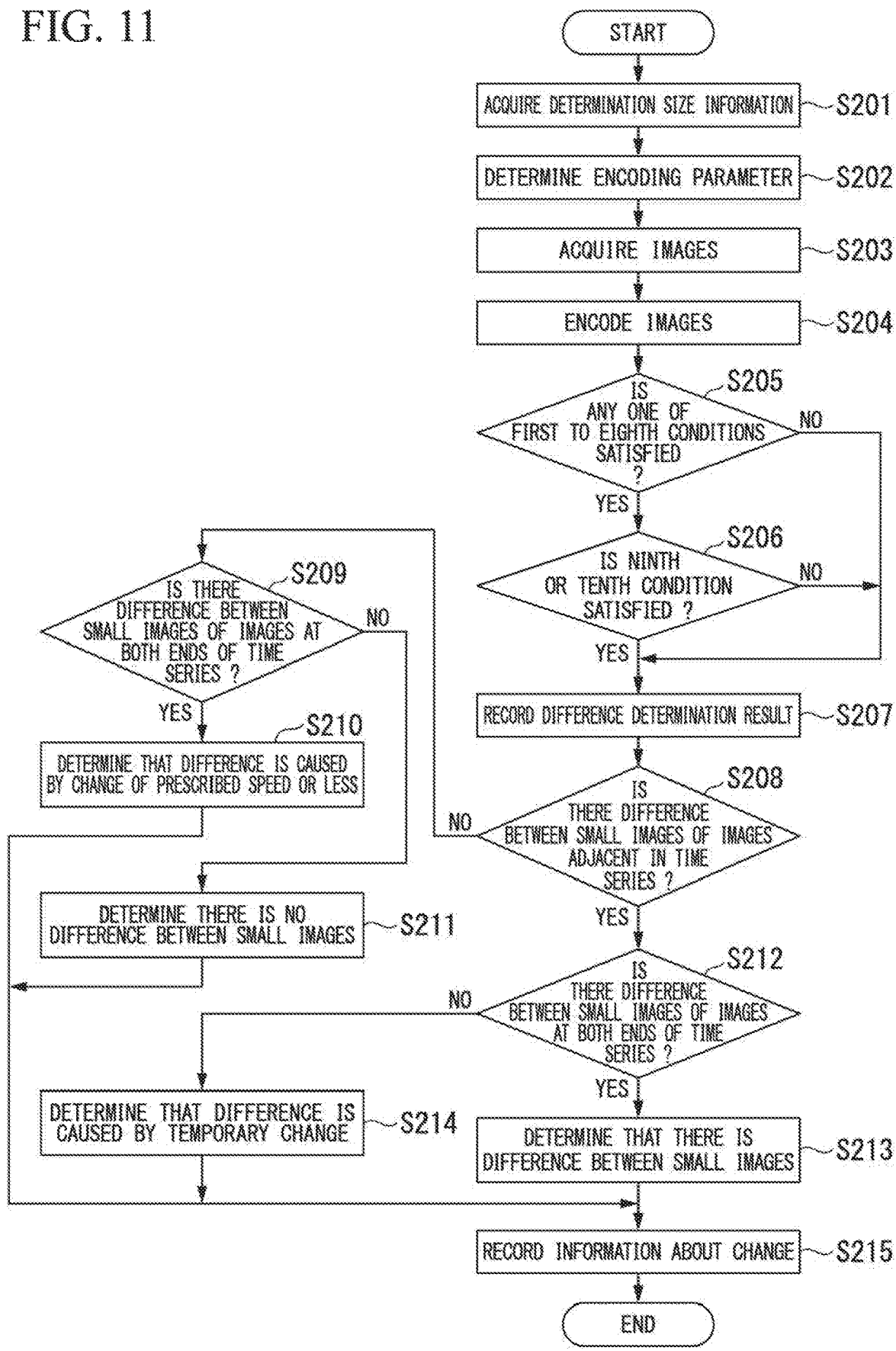
FIG. 11 is a flowchart showing an example of an operation of an image difference determination system in the second embodiment.

FIG. 11 is a flowchart showing an example of an operation of the image difference determination system in the second embodiment. Steps S201 to S207 are the same as steps S101 to S107 shown in FIG. 6.

The speed determination unit 36 determines whether or not there is a difference between small images of regions of images adjacent in a time series (step S208). When it is determined that there is no difference between the small images in the regions of the images adjacent in the time series (step S208: NO), the speed determination unit 36 determines whether or not that there is a difference between small images of regions of images at both ends of the time series in which it is determined that there is no difference between the small images of the regions of the images adjacent in the time series (step S209).

When it is determined that there is a difference between the small images of the regions of the images at both ends of the time series in which it is determined that there is no difference between the small images of the regions of the images adjacent in the time series (step S209: YES), the speed determination unit 36 determines that the difference between the small images of the regions of the images at both ends of the time series is caused by the change of the prescribed speed or less (step S210). When it is determined that there is no difference between the small images of the regions of the images at both ends of the time series in which it is determined that there is no difference between the small images of the regions of the images adjacent in the time series (step S209: NO), the speed determination unit 36 determines that there is no difference between the small images of the regions of in the time-series images (step S211).

If it is determined that there is a difference between the small images of the regions of the images adjacent in the time series (step S208: YES), the speed determination unit 36 determines whether or not there is a difference between small images of the regions of the images at both ends of the times series in which it is determined that there is a difference between small images of the regions of the images adjacent in the time series (step S212). When it is determined that there is a difference between the small images of the regions of the images at both ends of the time series in which it is determined that there is a difference between the small images in the region of the adjacent image in the time series (step S212: YES), the speed determination unit 36 determines that there is a difference between the small images of the regions of all the time series images (step S213). When it is determined that there is no difference between the small images of the image regions at both ends of the time series in which it is determined that there is a difference between the small images of the regions of the images adjacent in the time series (step S212: NO), the speed determination unit 36 determines that a difference between the small images of the regions of the time-series images is caused by the temporary change (step S214). The speed determination unit 36 records information about the change in the storage unit 37 (step S215).

As described above, as a determination result acquisition unit that acquires the determination result, the speed determination unit 36 of the second embodiment acquires a result of determining whether or not there is a difference between the small images of the regions of the time-series images. When it is determined that there is a difference between the small images of the regions of the images at both ends of the time series in which it is determined that there is no difference between the small images of the regions of the images adjacent in the time series, the speed determination unit 36 determines that the difference between the small images of the regions of the images of the time series is caused by the change of the prescribed speed or less.

Thereby, the image difference determination device 30 of the second embodiment can determine whether or not a difference between the small images of the regions of the time-series images is caused by the change of the prescribed speed or less. For example, when the images are aerial images or satellite images, the image difference determination device 30 of the second embodiment can determine whether or not there is a difference caused between small images of regions of the time-series images due to a change in an area of imaged reclaimed land for each piece of imaged reclaimed land.

In Patent Document 1, a device for determining whether or not there is a difference between time-series images in which substantially the same spatial region is imaged is described. A difference between the time-series images may be caused by a change of a prescribed speed or less in the imaged spatial region. For example, when the images are aerial images or satellite images, a change in an area of the imaged reclaimed land is a difference caused between the time-series images due to a change of a prescribed speed or less of the reclaimed land. The above-described device may not be able to determine whether or not a difference between the time-series images is a caused by the change of the prescribed speed or less. On the other hand, the image difference determination devices 30 of the above-described first and second embodiments can determine whether or not the difference between the time-series images is caused by the change of the prescribed speed or less. Also, the image difference determination device 30 can determine whether the difference in the spatial region photographed in the time-series image is caused by the change of the prescribed speed or less or a difference caused by the temporary change. In this manner, the image difference determination device 30 can determine a type of change to which a difference between time-series images belongs from a viewpoint of a progress state of a change. According to this determination, a meaning of whether the difference between the images is a temporary change occurring in a period shorter than a period during which the time-series images are captured or a constant change occurring in the period during which the time-series images are captured can be given.

Even if the image difference determination devices 30 of the first and second embodiments may estimate a period in which a difference occurs in time-series images on the basis of an interval of an imaging clock time of each image and a time-series image period. In this estimation, instead of the time-series image period, the period selected by the user during the time-series image period may be used.

The image difference determination device 30 serving as a change period estimation device includes the speed determination unit 36 serving as an acquisition unit and an estimation unit. The speed determination unit 36 acquires the presence or absence of a change in substantially the same space between time-series images configured from a plurality of images in which substantially the same space is imaged and estimates a period in which substantially the same space changes on the basis of the acquired presence or absence of a change in substantially the same space. A period during which substantially the same space changes or a period required for the change is estimated on the basis of an interval between the imaging clock times of the time-series images for which the presence or absence of a change is determined. The image difference determination device 30 can estimate a speed of a change in substantially the same space from a period in which substantially the same space changes and a degree of change in the time-series images.

Third Embodiment

Figure 12:
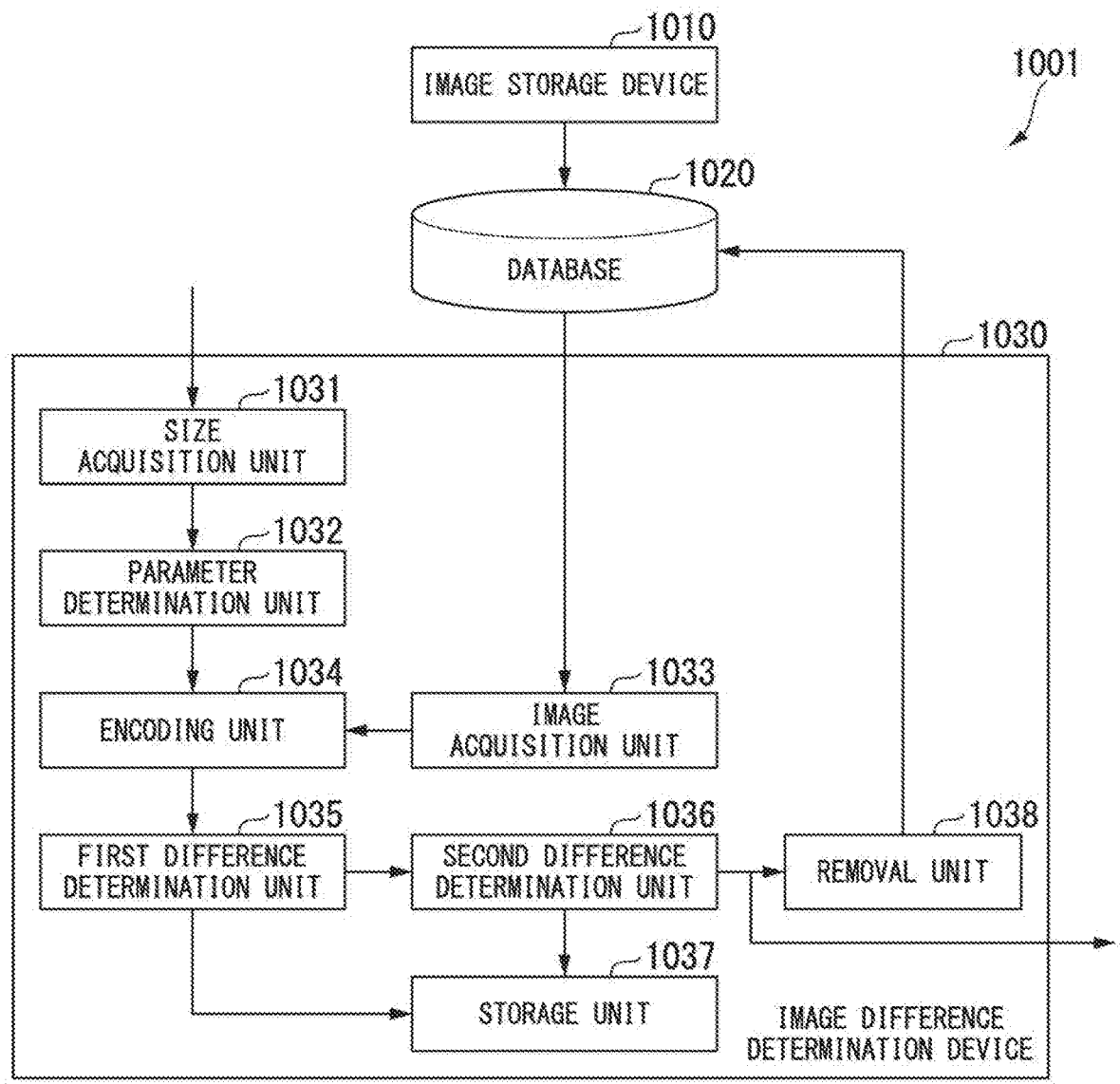
FIG. 12 is a diagram showing an example of a configuration of an image difference determination system in a third embodiment.

FIG. 12 is a diagram showing an example of a configuration of the image difference determination system 1001. The image difference determination system 1001 determines whether or not there is a difference between time-series images. The image difference determination system 1001 includes an image storage device 1010, a database 1020, and an image difference determination device 1030.

The image storage device 1010 is an information processing device configured to store images in the database 1020. The image storage device 1010 performs a filtering process of sorting images that satisfy a quality standard desired by a user with predetermined accuracy on time-series images. The quality standard, for example, means that a spatial region having an area having a fixed proportion or more among spatial regions of an imaging object is imaged. For example, when the images are aerial images or satellite images, the quality standard means that a spatial region of an area having a fixed proportion or more is imaged without being hidden by clouds or fog. Substantially the same spatial region is imaged in the time-series images. The images are, for example, medical images, monitoring images, aerial images, or satellite images. The satellite image is, for example, an image of substantially the same spatial region on a ground surface imaged by an artificial satellite at a frequency of about once per day. The image storage device 1010 stores time-series images sorted in a filtering process in the database 1020.

The database 1020 includes a storage device having a non-volatile recording medium (a non-transitory recording medium) such as a magnetic hard disk device or a semiconductor storage device. The database 1020 stores time-series images sorted according to a filtering process with prescribed accuracy. The time-series images stored by the database 1020 are images that satisfy a user-desired quality standard.

The images are divided into a plurality of regions (blocks). A shape of the region within the image is, for example, a rectangle. The region within the image is defined in an image in a unit of, for example, an MB of the MPEG or the like, a CU of HEVC or the like, an LCU, a PU, or a TU. Hereinafter, a case in which the regions are included in an image in units of LCUs will be described.

The image difference determination device 1030 is an information processing device that determines whether or not there is a difference between time-series images. The image difference determination device 1030 acquires the time-series image from the database 1020. The image difference determination device 1030 determines whether or not there is a difference between the time-series images stored in the database 1020. The image difference determination device 1030 determines whether or not the difference between the time-series images stored in the database 1020 is a temporary difference. The image difference determination device 1030 outputs a result of determining whether or not the difference between the time-series images is a temporary difference to the outside of the image difference determination device 1030. The image difference determination device 1030 may remove an image having a temporary difference from the time-series images stored in the database 1020.

The image difference determination device 1030 includes a size acquisition unit 1031, a parameter determination unit 1032, an image acquisition unit 1033, an encoding unit 1034, a first difference determination unit 1035, a second difference determination unit 1036, a storage unit 1037, and a removal unit 1038.

For example, some or all of the size acquisition unit 1031, the parameter determination unit 1032, the image acquisition unit 1033, the encoding unit 1034, the first difference determination unit 1035, the second difference determination unit 1036, and the removal unit 1038 may be implemented by a processor such as a CPU executing a program stored in the storage unit 1037 or implemented using hardware such as an LSI or an ASIC.

The size acquisition unit 1031 externally acquires information (hereinafter referred to as "determination size information") indicating a size (hereinafter referred to as a "determination size") of an object to be determined on an image. Hereinafter, the determination size indicates the size of the LCU. For example, the determination size is represented using the number of pixels. The size acquisition unit 1031 transmits the determination size information to the parameter determination unit 1032.

The parameter determination unit 1032 at least determines encoding parameters including information indicating the size of the LCU (hereinafter referred to as an "encoding size") and the like on the basis of the determination size. The parameter determination unit 1032 transmits the encoding parameters including the information indicating the encoding size and the like to the encoding unit 1034.

The image acquisition unit 1033 acquires time-series images from the database 1020. For example, the image acquisition unit 1033 acquires three or more time-series images. The image acquisition unit 1033 transmits the time-series images to the encoding unit 1034. Hereinafter, an image of an object for which it is determined whether or not there is a difference from the reference image is referred to as an "object image". The time-series images are sorted into the object image and reference images by the image acquisition unit 1033 or the first difference determination unit 1035 on the basis of a predetermined condition. The time-series images may be divided into the object image and the reference images and stored in the database 1020.

The encoding unit 1034 encodes the time-series images. For example, the encoding unit 1034 may execute a moving-image encoding process such as H.264/AVC, HEVC, or MPEG on the basis of the encoding parameters. The encoding unit 1034 may execute a still-image encoding process such as JPEG on the basis of the encoding parameters.

The encoding unit 1034 encodes the object image and the reference images on the basis of a determination size. If the moving-image encoding process of HEVC is executed, the encoding unit 1034 performs, for example, an intra-coding process of HEVC based on the determination size on the object image and the reference images.

The first difference determination unit 1035 determines whether or not there is a difference between a small image of a region of the object LCU and a small image of a region of an adjacent LCU on the basis of a difference between encoding information of the small image of the region of the object LCU and encoding information of the small image of the region of the adjacent LCU. For example, the first difference determination unit 1035 determines whether or not there is a difference between a small image of a region of the object LCU and a small image of a region of the adjacent LCU on the basis of a difference between the amount of coding bits of the region of the object LCU and the amount of coding bits of the region of the adjacent LCU.

When there is a difference between the small image of the region of the object LCU and the small image of the region of the adjacent LCU, the first difference determination unit 1035 further determines whether or not there is a difference between the small image of the region of the object LCU and the small image of the region of the same position LCU. The first difference determination unit 1035 determines whether or not there is a difference between the small image of the region of the object LCU and the small image of the region of the same position LCU on the basis of a difference between encoding information of the small image of the region of the object LCU and encoding information of the small image of the region of the same position LCU. For example, the first difference determination unit 1035 determines whether or not there is a difference between the small image of the region of the object LCU and the small image of the region of the adjacent LCU on the basis of a difference between the amount of coding bits of the region of the object LCU and the amount of coding bits of the region of the same position LCU.

A method in which the first difference determination unit 1035 determines whether or not there is a difference between the object image and the reference image is not limited to a specific method. For example, as in the difference determination units 35 in the first and second embodiments, the first difference determination unit 1035 determines whether or not there is a difference between small images on the basis of the amount of coding bits. Also, as in a case in which the difference determination unit 35 records the determination result in the storage unit 37, the first difference determination unit 1035 records the determination result in the storage unit 1037.

Figure 13:
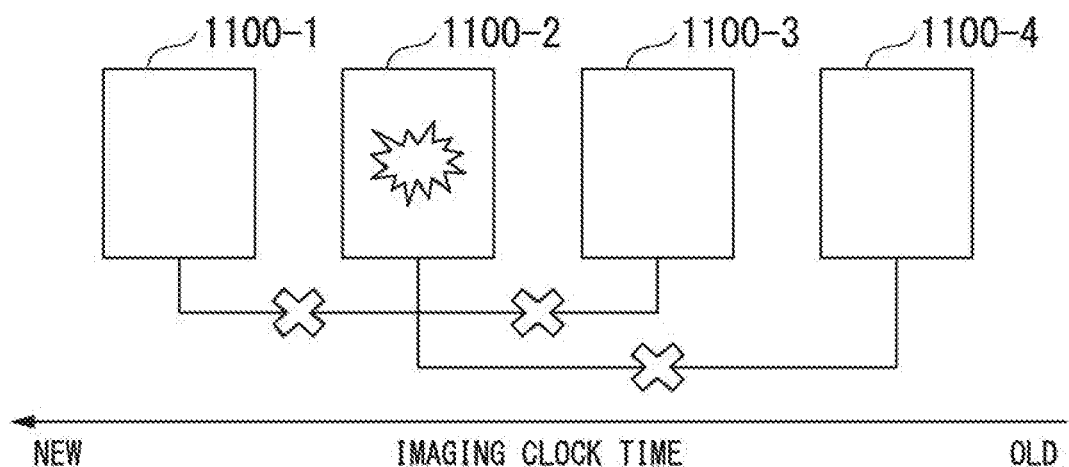
FIG. 13 is a diagram showing a first example of time-series images in the third embodiment.

FIG. 13 is a diagram showing a first example of time-series images in the third embodiment. In FIG. 13, images 1100 encoded by the encoding unit 1034 are schematically represented using images 1100 before encoding is performed. Images 1100-1 to 1100-4 are the time-series images. The image 1100-1 has the latest imaging clock time. Also, although a case in which the number of reference images is three will be described as an example in the third embodiment, the image difference determination device 1030 can determine whether or not the difference between the time-series images is a temporary difference if the number of reference images is two or more.

The first difference determination unit 1035 selects an image serving as an object image from the image 1100-2 or the image 1100-3 that is not positioned at an end of the time-series images. The first difference determination unit 1035 may select an image serving as an object image from the image 1100-1 or the image 1100-4 positioned at an end of the time-series images. When the number of time-series images is N (N is an integer of 3 or more), the first difference determination unit 1035 may determine a difference between the time-series images (N×(N−1)/2) times in total.

In the example shown in FIG. 13, the image 1100-2 is an object image. The image 1100-1, the image 1100-3, and the image 1100-4 are reference images. A cross mark between the images in FIG. 13 indicates that it has been determined that there is a difference between the images. The first difference determination unit 1035 determines that there is a difference between the image 1100-2 selected as an object image and the image 1100-1 that is a reference image. The first difference determination unit 1035 determines that there is a difference between the image 1100-2 selected as an object image and the image 1100-3 that is a reference image. The first difference determination unit 1035 determines that there is a difference between the image 1100-2 selected as an object image and the image 1100-4 that is a reference image.

Even when the image 1100-3 that is not positioned at an end of the time-series image is selected as an object image, the first difference determination unit 1035 similarly determines whether or not there is a difference between the object image and the reference image. Even when the image 1100-1 or the image 1100-4 positioned at an end of the time-series images is selected as an object image, the first difference determination unit 1035 may similarly determine whether or not there is a difference between the object image and the reference image.

Figure 14:
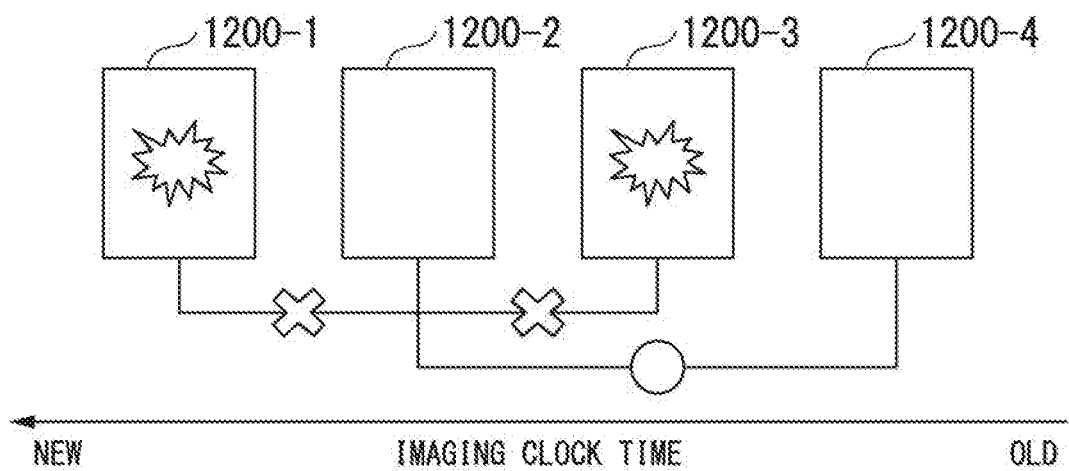
FIG. 14 is a diagram showing a second example of time-series images in the third embodiment.

FIG. 14 is a diagram showing a second example of time-series images in the third embodiment. In FIG. 14, images 1200 encoded by the encoding unit 1034 are schematically represented using images 1200 before encoding is performed. Images 1200-1 to 1200-4 are the time-series images. The image 1200-1 has the latest imaging clock time.

The first difference determination unit 1035 may select images serving as object images one by one from the images 1200-1 to 1200-4. In the example shown in FIG. 14, the image 1200-2 is an object image. The image 1200-1, the image 1200-3, and the image 1200-4 are reference images. A cross mark between the images in FIG. 14 indicates that it has been determined that there is a difference between the images. A circle mark between the images in FIG. 14 indicates that it has been determined that there is no difference between the images.

The first difference determination unit 1035 determines that there is a difference between the image 1200-2 selected as the object image and the image 1200-1 that is a reference image. The first difference determination unit 1035 determines that there is a difference between the image 1200-2 selected as an object image and the image 1200-3 that is a reference image. The first difference determination unit 1035 determines that there is no difference between the image 1200-2 selected as the object image and the image 1200-4 that is a reference image.

Even when the image 1200-3 that is not positioned at an end of the time-series images is selected as an object image, the first difference determination unit 1035 similarly determines whether or not there is a difference between the object image and the reference image. Even when the image 1200-1 or the image 1200-4 positioned at an end of the time-series images is selected as an object image, the first difference determination unit 1035 may similarly determine whether or not there is a difference between the object image and the reference image.

Returning to FIG. 12, the description of the configuration of the image difference determination device 1030 will be continued. The second difference determination unit 1036 (a temporary difference determination unit) determines whether or not the object image has a temporary difference on the basis of a result of comparing the number of reference images determined to have differences from the object image with the number of reference images determined not to have any difference from the object image (a result of decision by majority). For example, the second difference determination unit 1036 calculates a ratio of the number of reference images determined to have differences from the object image to the total number of reference images among the time-series images as a comparison result. The second difference determination unit 1036 determines whether or not the calculated ratio is greater than or equal to a first threshold value on the basis of a magnitude relationship shown in Eq. (1). The first threshold value is a predetermined positive value of 1 or less. Hereinafter, the first threshold value is 1 as an example.

$$\text{(Number of reference images determined to have differences from object image)/(Total number of reference images)} \geq \text{First threshold value} \quad (1)$$

The second difference determination unit 1036 determines that an object image whose value on the left side of Eq. (1) is greater than or equal to the first threshold value has a temporary difference. In the example shown in FIG. 13, the value on the left side of Eq. (1) is (3/3). Because the value on the left side of Eq. (1) is greater than or equal to the first threshold value, the second difference determination unit 1036 determines that the image 1100-2 has a temporary difference. The image having the temporary difference is, for example, an image in which a moving object that moves on the ground surface is imaged.

The second difference determination unit 1036 determines that the object image whose value on the left side of Eq. (1) is less than the first threshold value is not an image having a temporary difference. In the example shown in FIG. 14, the value on the left side of Eq. (1) is (2/3). Because the value on the left side of Eq. (1) is less than the first threshold value, the second difference determination unit 1036 determines that the image 1200-2 does not have a temporary difference.

The second difference determination unit 1036 records information indicating the image having the temporary difference in the storage unit 1037. The second difference determination unit 1036 outputs the information indicating the image having the temporary difference to the outside of the image difference determination device 1030. The second difference determination unit 1036 may output the information indicating the image having the temporary difference to the removal unit 1038. The information indicating the image having the temporary difference includes, for example, identification information of the image having the temporary difference.

The storage unit 1037 includes a storage device having a nonvolatile storage medium (a non-transitory recording medium) such as a magnetic hard disk device or a semiconductor storage device. The storage unit 1037 stores the determination result of the first difference determination unit 1035. The storage unit 1037 stores information indicating the image having the temporary difference. The removal unit 1038 removes the image having the temporary difference from the time-series images recorded in the database 1020.

Figure 15:
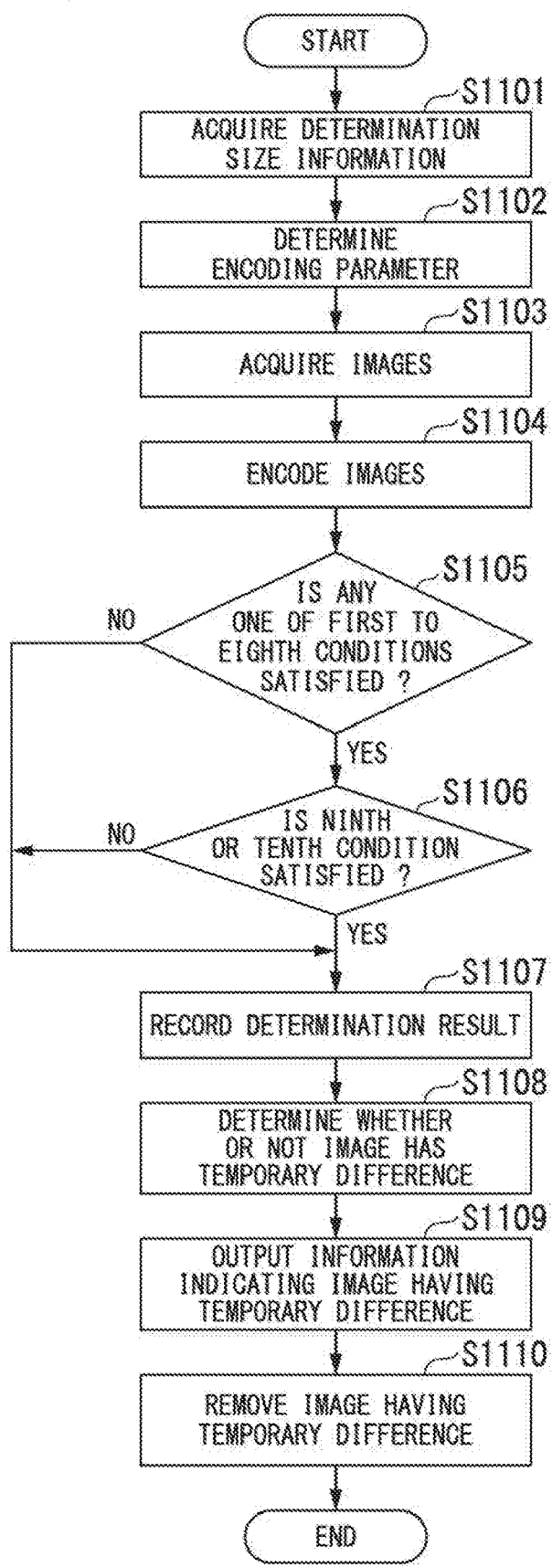
FIG. 15 is a flowchart showing an example of an operation of the image difference determination system in the third embodiment.

FIG. 15 is a flowchart showing an example of an operation of the image difference determination system 1001. The size acquisition unit 1031 acquires determination size information (step S1101). The parameter determination unit 1032 at least determines an encoding parameter, such as an encoding size, on the basis of a determination size (step S1102). The image acquisition unit 1033 acquires time-series images from the database 1020 (step S1103). The encoding unit 1034 encodes the time-series images (step S1104).

The first difference determination unit 1035 determines whether or not the relationship between the amount of coding bits of a region of an object LCU and the amount of coding bits of a region of an adjacent LCU satisfies any one of the first to eighth conditions shown in the first embodiment (step S1105). When the relationship between the amount of coding bits of the region of the object LCU and the amount of coding bits of the region of the adjacent LCU does not satisfy any one of the first to eighth conditions (step S1105: NO), the first difference determination unit 1035 moves the process to step S1107 so that a result of determining that there is no difference between the small image of the region of the object LCU and the small image of the region of the adjacent LCU is recorded in the storage unit 1037.

When the relationship between the amount of coding bits of the region of the object LCU and the amount of coding bits of the region of the adjacent LCU satisfies any one of the first to eighth conditions (step S1105: YES), the first difference determination unit 1035 determines whether or not the relationship between the amount of coding bits of the region of the object LCU and the amount of coding bits of the region of the same position LCU satisfies the ninth condition or the tenth condition shown in the first embodiment (step S1106).

When the relationship between the amount of coding bits of the region of the object LCU and the amount of coding bits of the region of the same position LCU does not satisfy either one of the ninth condition and the tenth condition (step S1106: NO), the first difference determination unit 1035 records a determination result indicating that it has been determined that there is no difference between the small image of the region of the object LCU and the small image of the region of the same position LCU in the storage unit 1037.

When the relationship between the amount of coding bits of the region of the object LCU and the amount of coding bits of the region of the same position LCU satisfies the ninth condition or the tenth condition (step S1106: YES), the first difference determination unit 1035 records a determination result indicating that it has been determined that there is a difference between the small image of the region of the object LCU and the small image of the region of the same position LCU in the storage unit 1037. In the third embodiment, the first difference determination unit 1035 determines a reference image for which it is determined that there is a difference between the small image of the object image and the small image of the reference image as the reference image having a difference from the object image (step S1107). The operations of steps S1105 to S1107 are performed for each of the regions (the object LCUs) in object images selected sequentially from the time-series images.

The second difference determination unit 1036 determines whether or not the object image has a temporary difference on the basis of a result of comparing the number of reference images determined to have differences with the number of reference images determined not to have any difference (step S1108). The second difference determination unit 1036 outputs information indicating an image having a temporary difference to the outside of the image difference determination device 1030 (step S1109). The second difference determination unit 1036 may output information indicating an image having a temporary difference to the removal unit 1038. The removal unit 1038 may remove images having a temporary difference between time-series images from the time-series images recorded in the database 1020 (step S1110).

As described above, the image difference determination device 1030 of the third embodiment includes the second difference determination unit 1036. The second difference determination unit 1036 acquires a result of determining whether or not there is a difference between the object image selected from the time-series images and the reference image. The second difference determination unit 1036 determines whether or not the object image has a temporary difference on the basis of a result of comparing the number of reference images determined to have differences from the object image with the number of reference images determined not to have any difference from the object image.

Thereby, the image difference determination device 1030 of the third embodiment can determine whether or not there is a difference between time-series images is a temporary difference. For example, when an object of a determination of whether or not there is a difference between the time-series images is a building, the image difference determination device 1030 of the third embodiment can accurately determine whether or not a difference between the time-series images is a temporary difference due to passage of an airplane or the like regardless of characteristics of an image.

Fourth Embodiment

The fourth embodiment is different from the third embodiment in that the first difference determination unit 1035 determines whether or not there is a difference between small images of regions. In the fourth embodiment, only differences from the third embodiment will be described.

Figure 16:
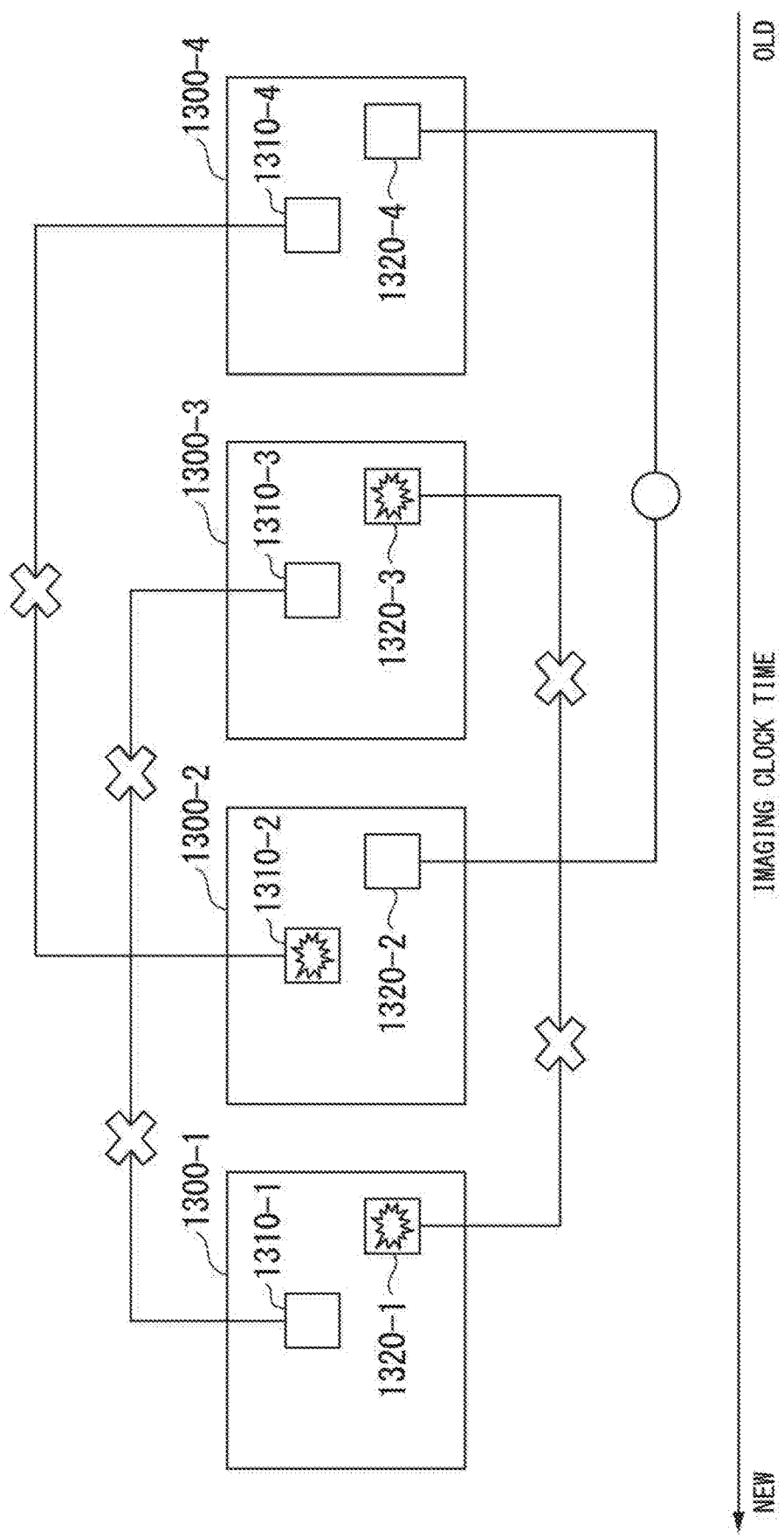
FIG. 16 is a diagram showing an example of time-series images in a fourth embodiment.

FIG. 16 is a diagram showing an example of time-series images in the fourth embodiment. In FIG. 16, images 1300 encoded by the encoding unit 1034 are schematically represented using images 1300 before encoding is performed. Images 1300-1 to 1300-4 are time-series images. The image 1300-1 has the latest imaging clock time. The image 1300 includes a region 1310 and a region 1320.

The first difference determination unit 1035 may select images serving as object images one by one from the images 1300-1 to 1300-4. In the example shown in FIG. 16, the image 1300-2 is an object image. The images 1300-1, 1300-3, and 1300-4 are reference images.

The first difference determination unit 1035 determines whether or not there is a difference between the small image of the region of the object LCU and the small image of the region of the same position LCU. For example, the first difference determination unit 1035 determines that there is a difference between the small image of a region 1310-2 of the object LCU and the small image of a region 1310-1 of the same position LCU. A cross mark between the images in FIG. 16 indicates that it has been determined that there is a difference between the small images. A circle mark between the images in FIG. 16 indicates that it has been determined that there is no difference between the small images. When there are four time-series images, the first difference determination unit 1035 may determine a difference between the time-series images 6 $(=4\times(4-1)/2)$ times in total.

The first difference determination unit 1035 determines that there is a difference between the small image of the region 1310-2 of the object LCU and the small image of the region 1310-1 of the same position LCU between the image 1300-2 and the image 1300-1. The first difference determination unit 1035 determines that there is a difference between the small image of the region 1310-2 of the object LCU and the small image of a region 1310-3 of the same position LCU between the image 1300-2 and the image 1300-3. The first difference determination unit 1035 determines that there is a difference between the small image of the region 1310-2 of the object LCU and the small image of a region 1310-4 of the same position LCU between the image 1300-2 and the image 1300-4.

The first difference determination unit 1035 determines that there is a difference between the small image of a region 1320-2 of the object LCU and the small image of a region 1320-1 of the same position LCU between the image 1300-2 and the image 1300-1. The first difference determination unit 1035 determines that there is a difference between the small image of the region 1320-2 of the object LCU and the small image of a region 1320-3 of the same position LCU between the image 1300-2 and the image 1300-3. The first difference determination unit 1035 determines that there is no difference between the small image of the region 1320-2 of the object LCU and the small image of a region 1320-4 of the same position LCU between the image 1300-2 and the image 1300-4.

Even when the image 1300-3 that is not positioned at an end of the time-series images has been selected as an object image, the first difference determination unit 1035 similarly determines whether or not there is a difference between the small image of the region of the object LCU and the small image of the region of the same position LCU. Even when the image 1300-1 or the image 1300-4 positioned at the end of the time series image has been selected as an object image, the first difference determination unit 1035 may similarly determine whether or not there is a difference between the small image of the region of the object LCU and the small image of the region of the same position LCU.

Returning to FIG. 12, the description of the configuration of the image difference determination device 1030 will be continued. As a determination result acquisition unit that acquires a determination result, the second difference determination unit 1036 acquires a determination result of the first difference determination unit 1035. The second difference determination unit 1036 determines whether or not a small image of a region of the object LCU has a temporary difference on the basis of a result of comparing the number of small images of the regions of the same position LCUs determined to have differences from the small image of the region of the object LCU with the number of small images of the regions of the same position LCUs determined not to have any difference from the small image of the region of the object LCU (a result of decision by majority).

For example, the second difference determination unit 1036 calculates a ratio (proportion) of the number of small images of the regions of the same position LCUs determined to have differences from the small image of the region of the object LCU to the total number (sum) of small images of the regions of the same position LCUs in the time-series images as a comparison result. The second difference determination unit 1036 determines whether or not the calculated ratio is greater than or equal to a second threshold value on the basis of the magnitude relationship shown in Eq. (2). The second threshold value is a predetermined positive value of 1 or less. Hereinafter, as an example, the second threshold value is 1.

(Number of small images of regions of same position LCUs determined to have differences from small image of region of object LCU)/(Total number of small images of regions of same position LCUs)≥Second threshold value (2)

The second difference determination unit 1036 determines that the small image of the region of the object LCU having a value of the left side of Eq. (2) greater than or equal to the second threshold value is a small image of a region of the same position LCU having a temporary difference. For the region 1310 shown in FIG. 16, the value of the left side of Eq. (2) is (3/3). Because the value of the left side of Eq. (2) is greater than or equal to the second threshold value, the second difference determination unit 1036 determines that the region 1310-2 of the image 1300-2 has a temporary difference.

The second difference determination unit 1036 determines that the small image of the region of the object LCU having a value of the left side of Eq. (2) less than the second threshold value is not a small image having a temporary difference. For the region 1320 shown in FIG. 16, the value of the left side of Eq. (2) is (⅔). Because the value of the left side of Eq. (2) is less than the second threshold value, the second difference determination unit 1036 determines that the region 1320-2 of the image 1300-2 does not have a temporary difference.

The second difference determination unit 1036 records information indicating a region of a small image having a temporary difference in the storage unit 1037. The second difference determination unit 1036 outputs the information indicating the region of the small image having the temporary difference to the outside of the image difference determination device 1030. The second difference determination unit 1036 may output the information indicating the region of the small image having the temporary difference to the removal unit 1038. The information indicating the region of the small image having the temporary difference includes, for example, identification information of the region of the small image having the temporary difference.

Figure 17:
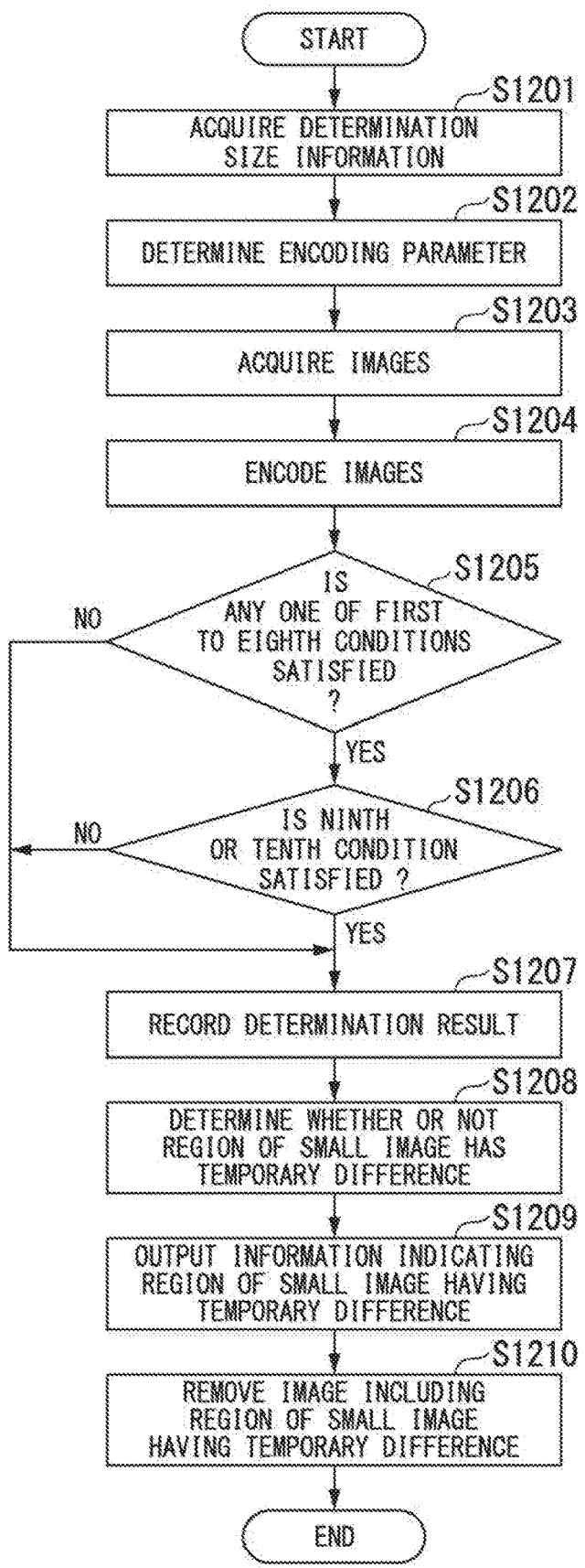
FIG. 17 is a flowchart showing an example of an operation of an image difference determination system in the fourth embodiment.

FIG. 17 is a flowchart showing an example of the operation of the image difference determination system in the fourth embodiment. Steps S1201 to S1207 are similar to steps S1101 to S1107 of FIG. 17.

The second difference determination unit 1036 determines whether or not the small image of the region of the object LCU has the temporary difference on the basis of a result of comparing the number of small images of the regions of the same position LCUs determined to have differences from the small image of the region of the object LCU with the number of small images of the regions of the same position LCUs determined not to have any difference from the small image of the region of the object LCU (step S1208). The second difference determination unit 1036 outputs information indicating the region of the small image having the temporary difference to the outside of the image difference determination device 1030 (step S1209). The second difference determination unit 1036 may output the information indicating the region of the small image having the temporary difference to the removal unit 1038. The removal unit 1038 may remove an image including the region of the small image having the temporary difference from the time-series images recorded in the database 1020 (step S1210).

As described above, the second difference determination unit 1036 of the fourth embodiment determines whether or not the object image has a temporary difference on the basis of a comparison result of a ratio of the number of regions within reference images including small images determined to have differences from a small image of a region within the object image to the total number of regions within the reference images among the time-series images. Thereby, the image difference determination device 1030 of the fourth embodiment can determine whether or not a difference between the small images of the regions within the images is a temporary difference.

Fifth Embodiment

The fifth embodiment is different from the third and fourth embodiments in that a second difference determination unit 1036 pre-selects a small number of reference images from time-series images. In the fifth embodiment, only differences from the third and fourth embodiments will be described.

The second difference determination unit 1036 pre-selects a plurality of reference images from the time-series images before the second difference determination unit 1036 determines whether or not the object image has a temporary difference. Before the second difference determination unit 1036 determines whether or not the small image of the region of the object LCU has a temporary difference, the second difference determination unit 1036 may pre-select a plurality of reference images from the time-series images. For example, the second difference determination unit 1036 selects one or more reference images with late imaging clock times and one or more reference images with early imaging clock times from the time-series images. Also, the plurality of selected reference images may not be adjacent to one another in the time series.

When it is determined that there is a difference between an image adjacent to the object image selected from the time-series images in the time direction and the object image, the second difference determination unit 1036 acquires whether or not there are differences between a plurality of reference images including a reference image having a late imaging clock time and a reference image with an early imaging clock time selected as described above and the object image. The second difference determination unit 1036 determines whether or not the object image has a temporary difference on the basis of whether or not there are differences between the plurality of reference images and the object image. The determination of the second difference determination unit 1036 in the fifth embodiment is similar to the determination of the second difference determination unit 1036 described in the third or fourth embodiment. The object image having a difference from the adjacent image may be designated by the user or an image obtained on the basis of whether or not there is a difference between images adjacent in the time-series images as will be described below.

The second difference determination unit 1036 may determine whether or not there is a difference between images adjacent in a time series before a reference image is selected. The second difference determination unit 1036 may select one or more reference images from time-series images with imaging clock times that are later than imaging clock times of images for which it is determined that there is a difference between images adjacent in the time series. The second difference determination unit 1036 may select one or more reference images from time-series images with imaging clock times that are earlier than imaging clock times of images for which it is determined that there is a difference between images adjacent in the time series.

Figure 18:
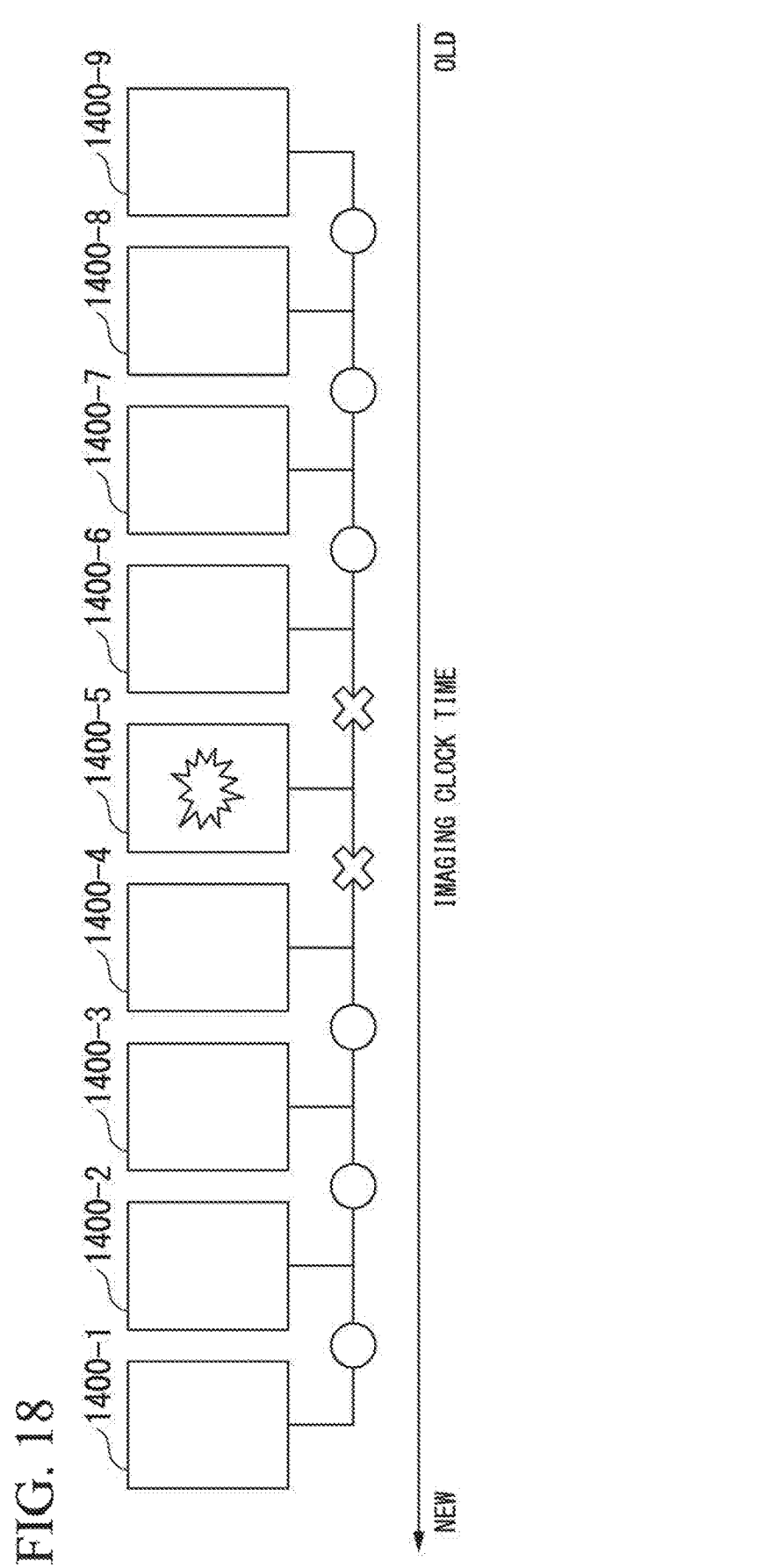
FIG. 18 is a diagram showing a first example of time-series images in a fifth embodiment.

FIG. 18 is a diagram showing a first example of time-series images in the fifth embodiment. In the example shown in FIG. 18, an image 1400-5 is an object image. Images 1400-1 to 1400-9 are the time-series images. Before the second difference determination unit 1036 determines whether or not the object image has a temporary difference, the second difference determination unit 1036 selects, for example, the images 1400-1 and 1400-2 as reference images having late imaging clock times. Before the second difference determination unit 1036 determines whether or not the object image has a temporary difference, the second difference determination unit 1036 selects, for example, the images 1400-8 and 1400-9 as reference images having early imaging clock times. The second difference determination unit 1036 determines whether or not the image 1400-5 has a temporary difference compared with each selected reference image on the basis of Eq. (1).

A cross mark between the images in FIG. 18 indicates that it has been determined that there is a difference between adjacent images when the adjacent images are selected as an object image and a reference image. A circle mark between the images in FIG. 18 indicates that it has been determined that there is no difference between adjacent images when the adjacent images are selected as an object image and a reference image. In the example shown in FIG. 18, the image 1400-5 has a difference from the adjacent image 1400-4 in the time series and has a difference from the adjacent image 1400-6 in the time series. The image 1400-5 is determined to have a difference from images on both sides of the image 1400-5 in the time series.

The second difference determination unit 1036 may select, for example, the image 1400-1 and the image 1400-2 serving as reference images, from time-series images with later imaging clock times than the imaging clock time of the image 1400-5 determined to have differences from images on both sides of the image 1400-5 in the time series. The second difference determination unit 1036 may select, for example, the image 1400-8 and the image 1400-9 serving as reference images, from time-series images with imaging clock times earlier than the imaging clock time of the image 1400-5 determined to have differences from images on both sides of the image 1400-5 in the time series.

When the number of images determined to have differences from the images on both sides thereof in the time series is a large number in the time-series images, the second difference determination unit 1036 cannot determine that images determined to have differences from images on both sides thereof in the time series are images having temporary differences. On the other hand, when the number of images determined to have differences from images on both sides thereof in the time series is a small number in the time-series images, the second difference determination unit 1036 may determine that images determined to have the differences from the images on both sides thereof in the time series are images having temporary differences. In the example shown in FIG. 18, because the number of images determined to have differences from images on both sides thereof in the time series is one among the time-series images, the second difference determination unit 1036 may determine that the image 1400-5 determined to have a difference from images on both sides thereof in the time series has a temporary difference.

Figure 19:
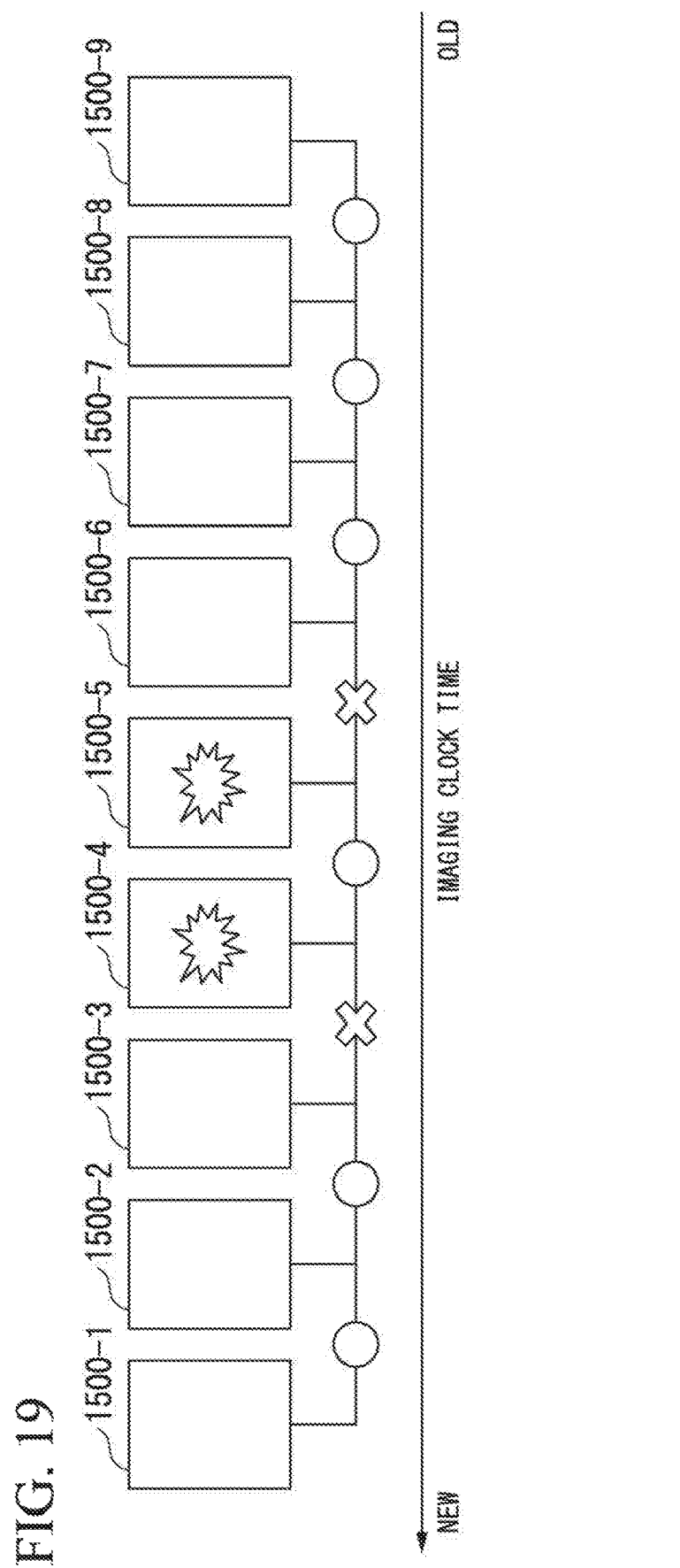
FIG. 19 is a diagram showing a second example of time-series images in the fifth embodiment.

FIG. 19 is a diagram showing a second example of time-series images in the fifth embodiment. Images 1500-1 to 1500-9 are the time-series images. Before the second difference determination unit 1036 determines whether or not the object image has a temporary difference, the second difference determination unit 1036 selects, for example, the images 1500-2 and 1500-3 as reference images having late imaging clock times. Before the second difference determination unit 1036 determines whether or not the object image has a temporary difference, the second difference determination unit 1036 selects, for example, the images 1500-7 and 1500-8 as reference images having early imaging clock times. The second difference determination unit 1036 determines whether or not the image 1500-4 has a temporary difference compared with each selected reference image on the basis of Eq. (1).

A cross mark between the images in FIG. 19 indicates that it has been determined that there is a difference between adjacent images when the adjacent images are selected as an object image and a reference image. A circle mark between the images in FIG. 19 indicates that it has been determined that there is no difference between adjacent images when the adjacent images are selected as an object image and a reference image. In the example shown in FIG. 19, the image 1500-4 is different from the adjacent image 1500-3 in the time series. The image 1500-5 is different from the adjacent image 1500-6 in the time series.

There is no difference between the images 1500-4 and 1500-5 adjacent in the time series. The second difference determination unit 1036 may integrally treat a plurality of images determined not to have any difference between images adjacent in the time series as an object for determining whether or not there is a temporary difference. In the example shown in FIG. 19, the second difference determination unit 1036 may integrally treat the image 1500-4 and the image 1500-5 as an object for determining whether or not there is a temporary difference. In the example shown in FIG. 19, when the image 1500-4 and the image 1500-5 are integrally treated, the images 1500-4 and 1500-5 are different from both the images 1500-3 and 1500-6 on both sides thereof in the time series.

The second difference determination unit 1036 may select images with imaging clock times later than imaging clock times of the images 1500-4 and the image 1500-5 determined to have differences from images on both sides thereof in the time series, for example, images 1500-2 and 1500-3 serving as reference images, from time-series images. The second difference determination unit 1036 may select images with imaging clock times earlier than imaging clock times of the images 1500-4 and the image 1500-5 determined to have differences from images on both sides thereof in the time series, for example, images 1500-7 and 1500-8 serving as reference images, from time-series images.

The second difference determination unit 1036 may determine that images determined to have differences from images on both sides thereof in the time series have temporary differences. In the example shown in FIG. 19, the second difference determination unit 1036 may determine that the image 1500-4 and the image 1500-5 determined to have differences from images on both sides in the time series have temporary differences.

As described above, before it is determined whether or not the object image has a temporary difference, the second difference determination unit 1036 of the fifth embodiment may select an image having a late imaging clock time and an image having an early imaging clock time from the time-series images as the reference images. The second difference determination unit 1036 of the fifth embodiment determines whether or not the object image has a temporary difference as compared with each selected reference image. Thereby, the image difference determination device 1030 of the fifth embodiment can determine whether or not a difference between the time-series images is a temporary difference by reducing an amount of calculation (the number of processes) as compared with a case in which no reference image is selected.

Also, the image difference determination device 1030 of the fifth embodiment may detect whether or not there is an image having a temporary difference among input time-series images by performing the above-described operation. For example, as shown in FIGS. 18 and 19, the first difference determination unit 1035 determines whether or not there is a difference between adjacent images among time-series images. The second difference determination unit 1036 selects an object image and a plurality of reference images from the time-series images in accordance with a determination result of the first difference determination unit 1035. The first difference determination unit 1035 determines whether or not there are differences between the object image and the plurality of reference images selected by the second difference determination unit 1036. The second difference determination unit 1036 determines whether or not the object image has a temporary difference.

When it is determined that the object image has a temporary difference according to the above operation, the image difference determination device 1030 outputs a result of determining that there is a temporary change in the input time-series images. If it is determined that the object image does not have a temporary difference, the image difference determination device 1030 outputs a result of determining that there is no temporary change in the input time-series images. By performing such an operation, the image difference determination device 1030 of the fifth embodiment can reduce the amount of calculation (the number of processes) when the presence or absence of a temporary change in the time-series images is obtained.

In Patent Document 2, a device that detects whether or not there is a moving object in the imaged same spatial region on the basis of the similarity of motion vectors in the time-series images is disclosed. However, because the similarity of the motion vectors depends on the characteristics of the image, the above-described device may not be able to determine whether or not a difference between the time-series images is a temporary difference. For example, when a moving object appears only in the image B among time-series images including three images A, B, and C, the motion vector of the moving object between the images A and B and the motion vector of the moving object between the images B and C are not obtained and the moving object may not be able to be detected. When the moving object appears in only one image, the detection of the moving object is not correctly performed because a direction and a magnitude of the motion vector of the moving object diverge. On the other hand, the image difference determination devices 1030 of the third, fourth and fifth embodiments may determine whether or not a difference between time-series images is a temporary difference in time-series images. In this manner, the image difference determination device 1030 determines whether or not a difference in the spatial region imaged in the time-series images is caused by a temporary change. According to this determination, the image difference determination device 1030 can determine a type of change corresponding to a difference in the time-series image and give a meaning to the difference.

When the image difference determination devices 1030 of the third, fourth, and fifth embodiments determine that an image has a temporary difference in time-series images, the image difference determination device 1030 may estimate a period during which the temporary difference occurs on the basis of an interval of an imaging clock time of each image and a time-series image period. In this estimation, a period selected by the user in the time-series image period may be used instead of the time-series image period. An image having a temporary difference is obtained by imaging a change occurring in a period from a timing when a reference image having an imaging clock time earlier than the imaging clock time of the image having the temporary difference has been captured to a timing when a reference image having an imaging clock time later than the imaging clock time of the image having the temporary difference has been captured.

The image difference determination device 1030 serving as a change period estimation device includes the second difference determination unit 1036 serving as an acquisition unit and an estimation unit. The second difference determination unit 1036 acquires the presence or absence of a change in substantially the same space between time-series images configured from a plurality of images obtained by imaging substantially the same space and estimates whether or not a period during which substantially the same space changes is temporary on the basis of the acquired presence or absence of the change in substantially the same space. The period during which substantially the same space changes or the period required for the change is estimated on the basis of the interval between the imaging clock times of the time-series images for which the presence or absence of a change is determined. The image difference determination device 1030 can estimate a speed of a change in substantially the same space from the period in which substantially the same space changes and the degree of change in the time-series image.

Sixth Embodiment

Figure 20:
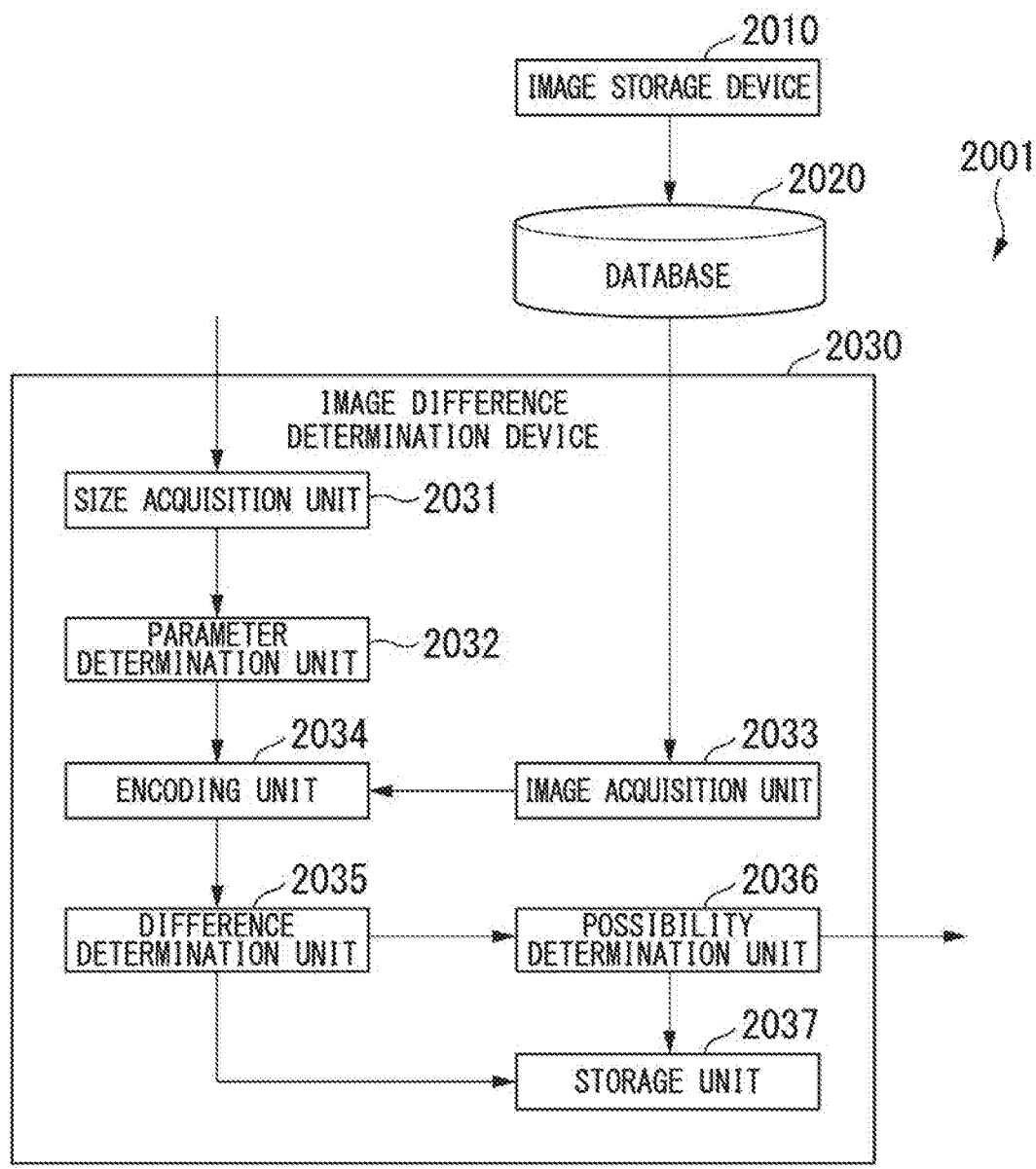
FIG. 20 is a diagram showing an example of a configuration of an image difference determination system in a sixth embodiment.

FIG. 20 is a diagram showing an example of a configuration of an image difference determination system 2001. The image difference determination system 2001 determines a possibility of an error of a result of determining whether or not there is a difference between time-series images. The image difference determination system 2001 includes an image storage device 2010, a database 2020, and an image difference determination device 2030.

The image storage device 2010 is an information processing device configured to store images in the database 2020. The image storage device 2010 performs a filtering process of sorting images that satisfy a quality standard desired by a user with predetermined accuracy on time-series images. The quality standard, for example, means that a spatial region having an area having a fixed proportion or more among spatial regions of an imaging object is imaged. For example, when the images are aerial images or satellite images, the quality standard means that a spatial region of an area having a fixed proportion or more is imaged without being hidden by clouds or fog. Substantially the same spatial region is imaged in the time-series images. The images are, for example, medical images, monitoring images, aerial images, or satellite images. The satellite image is, for example, an image of substantially the same spatial region on a ground surface imaged by an artificial satellite at a frequency of about once per day. The image storage device 2010 stores time-series images sorted in the filtering process in the database 2020.

The database 2020 includes a storage device having a non-volatile recording medium (a non-transitory recording medium) such as a magnetic hard disk device or a semiconductor storage device. The database 2020 stores time-series images sorted according to a filtering process with prescribed accuracy. The time-series images stored by the database 2020 satisfy a user-desired quality standard.

The images are divided into a plurality of regions (blocks) on the basis of a predetermined protocol. A shape of the region within the image is, for example, a rectangle. The region within the image is defined in an image in a unit of, for example, an MB of the MPEG or the like, a CU of HEVC or the like, an LCU, a PU, or a TU. Hereinafter, a case in which the regions are included in an image in units of LCUs will be described.

The image difference determination device 2030 is an information processing device that determines the possibility of an error of a result of determining whether or not there is a difference between time-series images. The image difference determination device 2030 acquires time-series images from the database 2020. The image difference determination device 2030 determines whether or not there is a difference between the time-series images stored in the database 2020. When there is no difference between any images adjacent in the time series among the time-series images stored in the database 2020, the image difference determination device 2030 determines the possibility of an error of a result of determining whether or not there is a difference between time-series images. The image difference determination device 2030 outputs a result of determining the possibility of the error of the determination result to the outside of the image difference determination device 2030. The image difference determination device 2030 outputs the result of determining the possibility of the error of the determination result to the storage unit 2037.

The image difference determination device 2030 includes a size acquisition unit 2031, a parameter determination unit 2032, an image acquisition unit 2033, an encoding unit 2034, a difference determination unit 2035, a possibility determination unit 2036, and the storage unit 2037. For example, some or all of the size acquisition unit 2031, the parameter determination unit 2032, the image acquisition unit 2033, the encoding unit 2034, the difference determination unit 2035, and the possibility determination unit 2036 may be implemented by a processor such as a CPU executing a program stored in the storage unit 2037 or implemented using hardware such as an LSI or an ASIC.

The size acquisition unit 2031 externally acquires information (hereinafter referred to as "determination size information") indicating a size (hereinafter referred to as a "determination size") of an object to be determined on the image. Hereinafter, the determination size indicates the size of the LCU. For example, the determination size is represented using the number of pixels. The size acquisition unit 2031 transmits the determination size information to the parameter determination unit 2032.

The parameter determination unit 2032 at least determines encoding parameters including information indicating the size of the LCU (hereinafter referred to as an "encoding size") and the like on the basis of the determination size. The parameter determination unit 2032 transmits the encoding parameters including the information indicating the encoding size and the like to the encoding unit 2034.

The image acquisition unit 2033 acquires time-series images from the database 2020. For example, the image acquisition unit 2033 acquires three or more time-series images. The image acquisition unit 2033 transmits the time-series images to the encoding unit 2034. Hereinafter, an image of an object for which it is determined whether or not there is a difference from the reference images is referred to as an "object image". The reference images are images other than the object image among the time-series images. The time-series images are sorted into the object image and reference images by the image acquisition unit 2033 or the difference determination unit 2035 on the basis of a predetermined condition. The time-series images may be divided into the object image and the reference images and stored in the database 2020.

The encoding unit 2034 encodes the object image and the reference images. For example, the encoding unit 2034 may execute a moving-image encoding process such as H.264/AVC, HEVC, or MPEG on the basis of the encoding parameters. The encoding unit 2034 may execute a still-image encoding process such as JPEG on the basis of the encoding parameters.

The encoding unit 2034 encodes the object image and the reference images on the basis of a determination size. If the moving-image encoding process of HEVC is executed, the encoding unit 2034 performs, for example, an intra-coding process of HEVC based on the determination size on the object image and the reference images.

The difference determination unit 2035 determines whether or not there is a difference between a small image of a region of the object LCU and a small image of a region of an adjacent LCU on the basis of a difference between encoding information of the small image of the region of the object LCU and encoding information of the small image of the region of the adjacent LCU. For example, the difference determination unit 2035 determines whether or not there is a difference between a small image of a region of the object LCU and a small image of a region of the adjacent LCU on the basis of a difference between the amount of coding bits of the region of the object LCU and the amount of coding bits of the region of the adjacent LCU.

When there is a difference between the small image of the region of the object LCU and the small image of the region of the adjacent LCU, the difference determination unit 2035 further determines whether or not there is a difference between the small image of the region of the object LCU and the small image of the region of the same position LCU. The difference determination unit 2035 determines whether or not there is a difference between the small image of the region of the object LCU and the small image of the region of the same position LCU on the basis of a difference between encoding information of the small image of the region of the object LCU and encoding information of the small image of the region of the same position LCU. For example, the difference determination unit 2035 determines whether or not there is a difference between the small image of the region of the object LCU and the small image of the region of the adjacent LCU on the basis of a difference between the amount of coding bits of the region of the object LCU and the amount of coding bits of the region of the same position LCU.

A method in which the difference determination unit 2035 determines whether or not there is a difference between the object image and the reference image is not limited to a specific method. For example, as in the difference determination units 35 in the first and second embodiments, the difference determination unit 2035 determines whether or not there is a difference between small images on the basis of the amount of coding bits. Also, as in a case in which the difference determination unit 35 records the determination result in the storage unit 37, the difference determination unit 2035 records the determination result in the storage unit 2037.

Although a case in which the number of time-series images is three as an example will be described hereinafter, the image difference determination device 2030 can determine a possibility (accuracy) of an error of a result of determining whether or not there is a difference between the time-series images if the number of time-series images is three or more.

Figure 21:
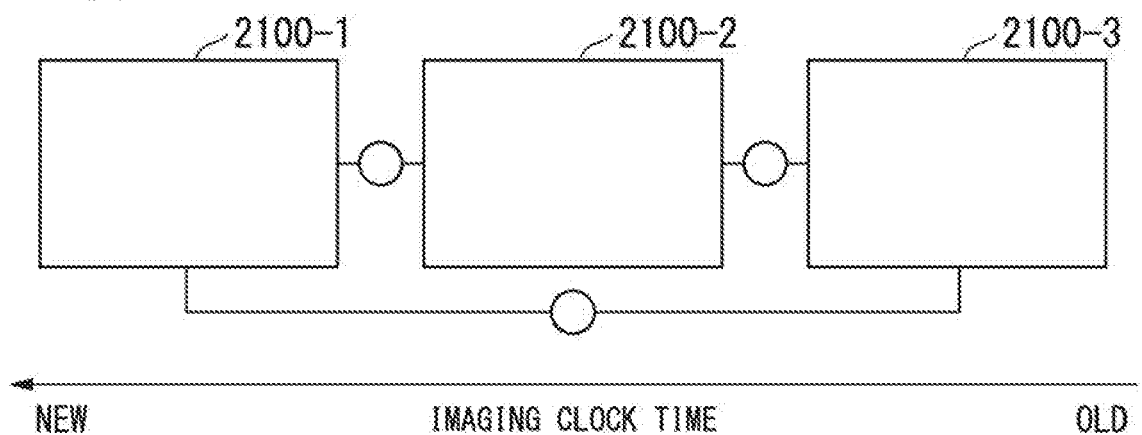
FIG. 21 is a diagram showing a first example of time-series images in the sixth embodiment.

FIG. 21 is a diagram showing a first example of time-series images in the sixth embodiment. In FIG. 21, images 2100 encoded by the encoding unit 2034 are schematically represented using images 2100 before encoding is performed. Images 2100-1 to 2100-3 are the time-series images. The image 2100-1 has the latest imaging clock time.

The difference determination unit 2035 determines whether or not there is a difference between images adjacent in the time series. In the example shown in FIG. 21, the difference determination unit 2035 selects images serving as object images one by one from the images 2100-1 to 2100-3. The difference determination unit 2035 determines that there is no difference between the image 2100-1 selected as an object image and the image 2100-2 that is a reference image. A circle mark between the images in FIG. 21 indicates that it has been determined that there is no difference between the images. The difference determination unit 2035 determines that there is no difference between the image 2100-2 selected as an object image and the image 2100-3 that is a reference image.

The difference determination unit 2035 further determines whether there is a difference between images that are not adjacent in the time series. For example, the difference determination unit 2035 determines whether or not there is a difference between images at both ends of the time series. In the example shown in FIG. 21, the difference determination unit 2035 determines that there is no difference between the image 2100-3 selected as an object image and the image 2100-1 that is a reference image with respect to the images 2100-1 and 2100-3 at both ends of the time series.

Figure 22:
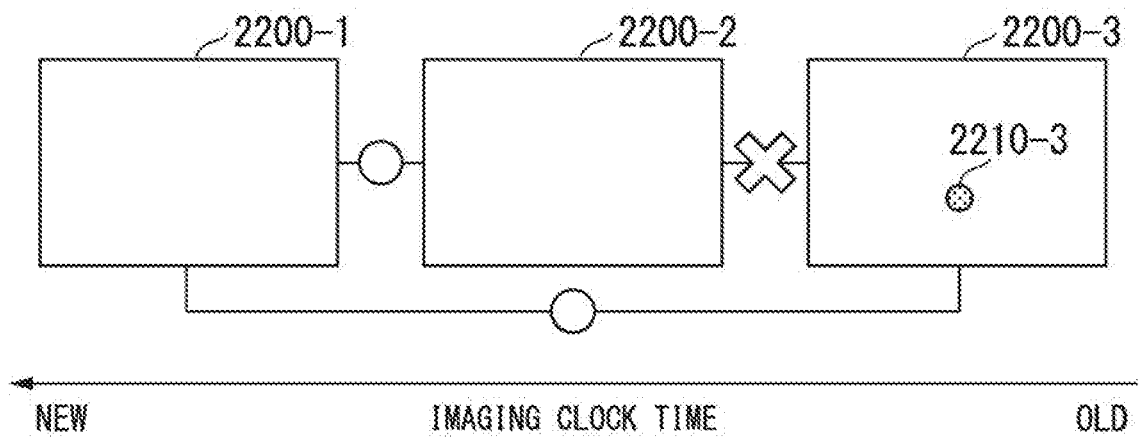
FIG. 22 is a diagram showing a second example of time-series images in the sixth embodiment.

FIG. 22 is a diagram showing a second example of time-series images in the sixth embodiment. In FIG. 22, images 2200 encoded by the encoding unit 2034 are schematically represented using images 2200 before encoding is performed. Images 2200-1 to 2200-3 are the time-series images. The image 2200-1 has the latest imaging clock time. The image 2200-3 includes a subject image 2210-3. For example, when the images 2200 are aerial images or satellite images, the subject image 2210-3 shows a planimetric feature such as a river, a coastline, a mountain, a tree, or a building.

In the example shown in FIG. 22, the difference determination unit 2035 selects images serving as object images one by one from the images 2200-1 to 2200-3. The difference determination unit 2035 determines that there is no difference between the image 2200-1 selected as an object image and the image 2200-2 that is a reference image. A circle mark between the images in FIG. 22 indicates that it has been determined that there is no difference between the images. The difference determination unit 2035 determines that there is a difference between the image 2200-2 selected as an object image and the image 2200-3 that is a reference image. A cross mark between the images in FIG. 22 indicates that it has been determined that there is a difference between the images. In the example shown in FIG. 22, the difference determination unit 2035 determines that there is no difference between the image 2200-3 selected as an object image and the image 2200-1 that is a reference image with respect to the images 2200-1 and 2200-3 at both ends of the time series.

Figure 23:
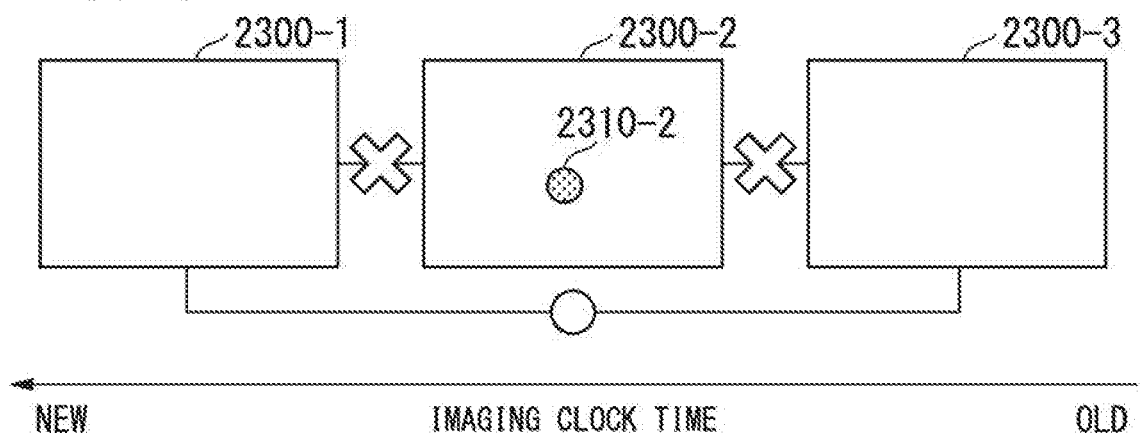
FIG. 23 is a diagram showing a third example of time-series images in the sixth embodiment.

FIG. 23 is a diagram showing a third example of time-series images in the sixth embodiment. In FIG. 23, images 2300 encoded by the encoding unit 2034 are schematically represented using images 2300 before encoding is performed. Images 2300-1 to 2300-3 are the time-series images. The image 2300-1 has the latest imaging clock time. The image 2300-2 includes a subject image 2310-2. For example, when the images 2300 are aerial images or satellite images, the subject image 2310-2 shows a planimetric feature such as a river, a coastline, a mountain, a tree, or a building. The image 2300-3 may include a subject image different from the subject image 2310-2.

In the example shown in FIG. 23, the difference determination unit 2035 selects images serving as object images one by one from the images 2300-1 to 2300-3. The difference determination unit 2035 determines that there is a difference between the image 2300-1 selected as an object image and the image 2300-2 that is a reference image. A cross mark between the images in FIG. 23 indicates that it has been determined that there is a difference between the images. The difference determination unit 2035 determines that there is a difference between the image 2300-2 selected as an object image and the image 2300-3 that is a reference image. The difference determination unit 2035 determines that there is a difference between the image 2300-3 selected as an object image and the image 2300-1 that is a reference image with respect to the images 2300-1 and 2300-3 at both ends of the time series. A circle mark between the images in FIG. 23 indicates that it has been determined that there is no difference between the images.

Figure 24:
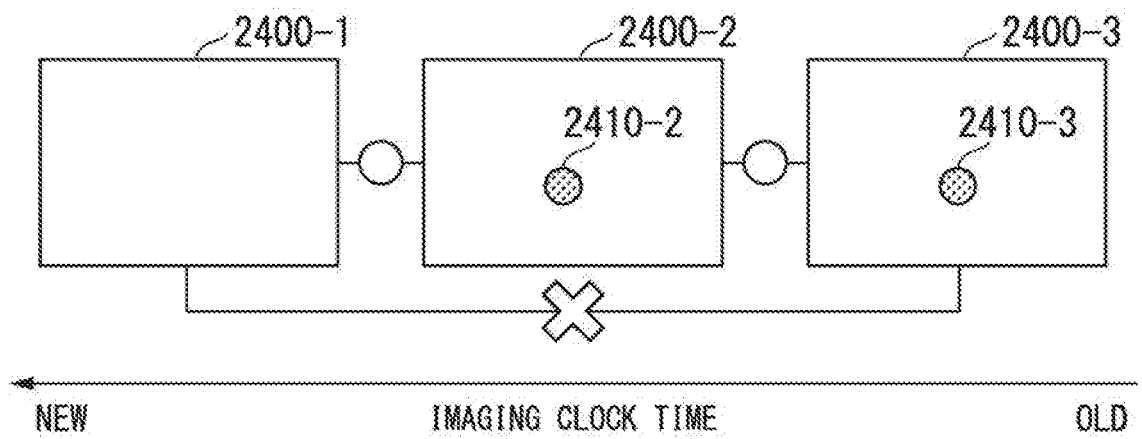
FIG. 24 is a diagram showing a fourth example of time-series images in the sixth embodiment.

FIG. 24 is a diagram showing a fourth example of time-series images in the sixth embodiment. In FIG. 24, images 2400 encoded by the encoding unit 2034 are schematically represented using images 2400 before encoding is performed. Images 2400-1 to 2400-3 are the time-series images. The image 2400-1 has the latest imaging clock time. The image 2400-2 includes a subject image 2410-2. The image 2400-3 includes a subject image 2410-3. For example, when the images 2400 are aerial images or satellite images, the subject image 2410 shows a moving object such as a vehicle.

In the example shown in FIG. 24, the difference determination unit 2035 selects images serving as object images one by one from the images 2400-1 to 2400-3. In the example shown in FIG. 24, the difference determination unit 2035 determines that there is no difference between the image 2400-1 selected as an object image and the image 2400-2 that is a reference image. A circle mark between the images in FIG. 24 indicates that it has been determined that there is no difference between the images. The difference determination unit 2035 determines that there is no difference between the image 2400-2 selected as an object image and the image 2400-3 that is a reference image. The difference determination unit 2035 determines that there is a difference between the image 2400-1 selected as an object image and the image 2400-3 that is a reference image with respect to the images 2400-1 and 2400-3 at both ends of the time series. A cross mark between the images in FIG. 24 indicates that it has been determined that there is a difference between the images.

Figure 25:
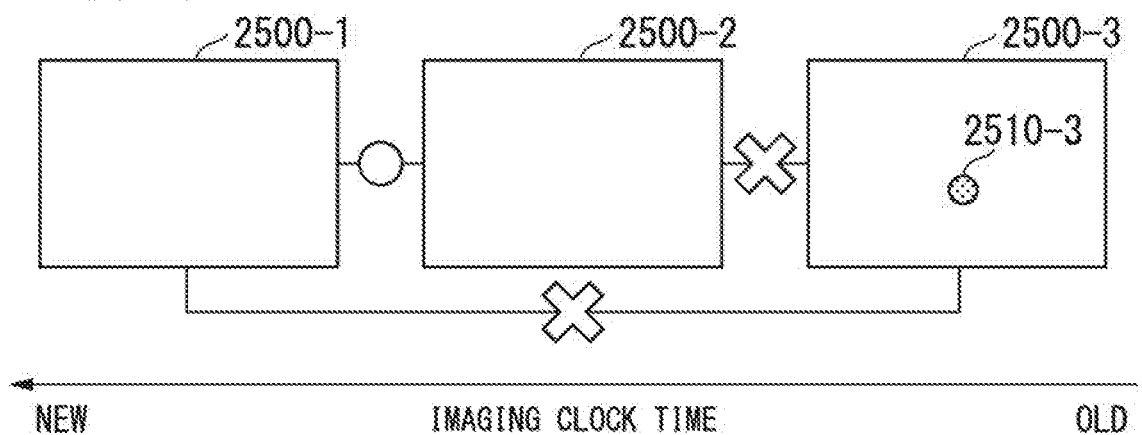
FIG. 25 is a diagram showing a fifth example of time-series images in the sixth embodiment.

FIG. 25 is a diagram showing a fifth example of time-series images in the sixth embodiment. In FIG. 25, images 2500 encoded by the encoding unit 2034 are schematically represented using images 2500 before encoding is performed. Images 2500-1 to 2500-3 are the time-series images. The image 2500-1 has the latest imaging clock time. The image 2500-3 includes a subject image 2510-3. For example, when the image 2500-3 is an aerial image or a satellite image, the subject image 2510-3 shows a planimetric feature such as a river, a coastline, a mountain, a tree, or a building.

In the example shown in FIG. 25, the difference determination unit 2035 selects images serving as object images one by one from the images 2500-1 to 2500-3. The difference determination unit 2035 determines that there is no difference between the image 2500-1 selected as an object image and the image 2500-2 that is a reference image. A circle mark between the images in FIG. 25 indicates that it has been determined that there is no difference between the images. The difference determination unit 2035 determines that there is a difference between the image 2500-2 selected as an object image and the image 2500-3 that is a reference image. A cross mark between the images in FIG. 25 indicates that it has been determined that there is a difference between the images. The difference determination unit 2035 determines that there is a difference between the image 2500-1 selected as an object image and the image 2500-3 that is a reference image with respect to the images 2500-1 and 2500-3 at both ends of the time series.

Figure 26:
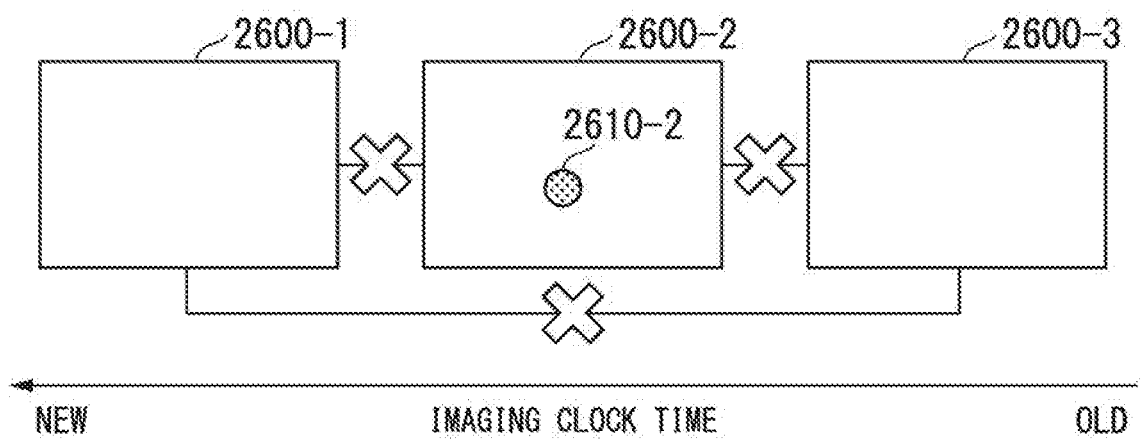
FIG. 26 is a diagram showing a sixth example of time-series images in the sixth embodiment.

FIG. 26 is a diagram showing a sixth example of time-series images in the sixth embodiment. In FIG. 26, images 2600 encoded by the encoding unit 2034 are schematically represented using images 2600 before encoding is performed. Images 2600-1 to 2600-3 are the time-series images. The image 2600-1 has the latest imaging clock time. The image 2600-2 includes a subject image 2610-2. For example, when the image 2600-2 is an aerial image or a satellite image, the subject image 2610-2 shows a planimetric feature such as a river, a coastline, a mountain, a tree, or a building.

In the example shown in FIG. 26, the difference determination unit 2035 selects images serving as object images one by one from the images 2600-1 to 2600-3. The difference determination unit 2035 determines that there is a difference between the image 2600-1 selected as an object image and the image 2600-2 that is a reference image. A cross mark between the images in FIG. 26 indicates that it has been determined that there is a difference between the images. The difference determination unit 2035 determines that there is a difference between the image 2600-2 selected as an object image and the image 2600-3 that is a reference image. The difference determination unit 2035 determines that there is a difference between the image 2600-1 selected as an object image and the image 2600-3 that is a reference image with respect to the images 2600-1 and 2600-3 at both ends of the time series.

Returning to FIG. 20, the description of the configuration of the image difference determination device 2030 will be continued. The possibility determination unit 2036 acquires a result of determining whether or not there is a difference between images from the difference determination unit 2035. The possibility determination unit 2036 obtains a determination data table from the storage unit 2037.

FIG. 27 is a diagram showing an example of a determination data table in the sixth embodiment. The determination data table is used for determining a possibility of an error of a determination result. In the determination data table, information indicating whether or not the possibility of the error of the determination result is greater than a threshold value is registered when there is no difference between any images adjacent in the time series. When the possibility of the error of the determination result is greater than the threshold value, the possibility of the error of the determination result is greater than 0% and less than or equal to 100%. When the possibility of the error of the determination result is less than the threshold value, the possibility of the error of the determination result is greater than or equal to 0% and less than 100%. Also, information indicating that it is impossible to determine the possibility of the error of the determination result is registered when there are differences between all the images adjacent in the time series.

In the determination data table shown in FIG. 27, the determination result is associated with each combination of a $31^{st}$ condition and a $32^{nd}$ condition related to whether or not there is a difference between images. The $31^{st}$ condition is that "there is no difference between all images adjacent in the time series", "there are images for which that is no difference between images adjacent in the time series and images for which there is a difference therebetween" and "there are differences between all images adjacent in the time series". The $32^{nd}$ condition is "there is no difference between images that are not adjacent in the time series" and "there is a difference between images that are not adjacent in the time series". Any one of a "low possibility of an error", a "high possibility of an error", and an "impossible determination of a possibility of an error" is associated with respect to the six combinations of these conditions.

Returning to FIG. 20, the description of the configuration of the image difference determination device 2030 will be continued. The possibility determination unit 2036 determines the possibility of an error of a result of determining whether or not there is a difference between the time-series images on the basis of a result of determining whether or not there is a difference between the images and the determination data table. When there is no difference between any images adjacent in the time series, the possibility determination unit 2036 determines the possibility of an error of a result of determining whether or not there is a difference between the time-series images.

When it is determined that there is no difference between all images adjacent in the time series among the time-series images and it is determined that there is also no difference between images that are not adjacent in the time series, the possibility determination unit 2036 determines that a possibility of an error of a result of determining whether or not there is a difference between time-series images is less than the threshold value.

In the example shown in FIG. 21, the difference determination unit 2035 determines that there is no difference between images 2100-1 to 2100-3 adjacent in the time series. On the other hand, the difference determination unit 2035 determines that there is no difference between the image 2100-1 and the image 2100-3 that are not adjacent in the time series. In the example shown in FIG. 21, there is no inconsistency in a result of determining whether or not there is a difference between images. Therefore, the possibility determination unit 2036 determines that the possibility of the error of the result of determining whether or not there is a difference between the time-series images 2100-1 to 2100-3 is low. The possibility determination unit 2036 records information indicating that the possibility of the error of the result of determining whether or not there is a difference between time-series images in the storage unit 2037. The possibility determination unit 2036 outputs the information indicating that the possibility of the error of the result of determining whether or not there is a difference between time-series images is low to the outside of the image difference determination device 2030.

The possibility determination unit 2036 determines that the possibility of the error of the result of determining whether or not there is a difference between time-series images is greater than the threshold value when it is determined that there are images for which it is determined that there is no difference between images adjacent in the time series and images for which it is determined that there is a difference therebetween among time-series images and that there is no difference between images that are not adjacent in the time series.

In the example shown in FIG. 22, the difference determination unit 2035 determines that there is no difference between the image 2200-1 and the image 2200-2 adjacent in the time series. The difference determination unit 2035 determines that there is a difference between the adjacent images 2200-2 and 2200-3 in the time series. On the other hand, the difference determination unit 2035 determines that there is no difference between the images 2200-1 and 2200-3 that are not adjacent in the time series. In the example shown in FIG. 22, there is an inconsistency in the result of determining whether or not there is a difference between images. Therefore, the possibility determination unit 2036 determines that there is a high possibility of an error of a result of determining whether or not there is a difference between the time-series images 2200-1 to 2200-3. The possibility determination unit 2036 records information indicating that there is a high possibility of the error of the result of determining whether or not there is a difference between the time-series images in the storage unit 2037. The possibility determination unit 2036 outputs the information indicating that there is a high possibility of the error of the result of determining whether or not there is a difference between the time-series images to the outside of the image difference determination device 2030.

When it is determined that there are differences between all the images adjacent in the time series, the possibility determination unit 2036 determines that it is impossible to determine a possibility of an error of a result of determining whether or not there is a difference between the time-series images. When there are differences between all the images adjacent in the time series, the possibility determination unit 2036 determines that it is impossible to determine a possibility of an error of a result of determining whether or not there is a difference between the time-series images even when it is determined that there is no difference between images that are not adjacent in the time series.

In the example shown in FIG. 23, the difference determination unit 2035 determines that there is a difference between the image 2300-1 and the image 2300-2 adjacent in the time series. The difference determination unit 2035 determines that there is a difference between the image 2300-2 and the image 2300-3 adjacent in the time series. That is, the difference determination unit 2035 determines that there are differences between all the images adjacent in the time series. Therefore, the possibility determination unit 2036 determines that it is impossible to determine the possibility of the error of the result of determining whether or not there is a difference between the time-series images 2300-1 to 2300-3. The possibility determination unit 2036 records information indicating that it is impossible to determine the possibility of the error of the result of determining whether or not there is a difference between the time-series images in the storage unit 2037. The possibility determination unit 2036 outputs the information indicating that it is impossible to determine the possibility of the error of the result of determining whether or not there is a difference between the time-series images to the outside of the image difference determination device 2030.

When the possibility determination unit 2036 determines that the possibility of the error of the result of determining whether or not there is a difference between the time-series images is greater than the threshold value when it is determined that there is no difference between all images adjacent in the time series among the time-series images and it is determined that there is a difference between images that are not adjacent in the time series.

In the example shown in FIG. 24, the difference determination unit 2035 determines that there is a difference between the image 2400-1 and the image 2400-2 adjacent in the time series. The difference determination unit 2035 determines that there is no difference between the image 2400-2 and the image 2400-3 adjacent in the time series. On the other hand, the difference determination unit 2035 determines that there is a difference between the images 2400-1 and 2400-3 that are not adjacent in the time series. In the example shown in FIG. 24, there is an inconsistency in the result of determining whether or not there is a difference between images. Therefore, the possibility determination unit 2036 determines that there is a high possibility of an error of a result of determining whether or not there is a difference between the time-series images 2400-1 to 2400-3. The possibility determination unit 2036 records the information indicating that there is a high possibility of the error of the result of determining whether or not there is a difference between the time-series images in the storage unit 2037. The possibility determination unit 2036 outputs the information indicating that there is a high possibility of the error of the result of determining whether or not there is a difference between the time-series images to the outside of the image difference determination device 2030.

The possibility determination unit 2036 determines that the possibility of the error of the result of determining whether or not there is a difference between the time-series images is less than the threshold value when it is determined that there are images for which it is determined that there is no difference between images adjacent in the time series and images for which it is determined that there is a difference therebetween among time-series images and that there is a difference between images that are not adjacent in the time series.

In the example shown in FIG. 25, the difference determination unit 2035 determines that there is no difference between the image 2500-1 and the image 2500-2 adjacent in the time series. The difference determination unit 2035 determines that there is a difference between the image 2500-2 and the image 2500-3 adjacent in the time series. On the other hand, the difference determination unit 2035 determines that there is a difference between the images 2500-1 and 2500-3 that are not adjacent in the time series. In the example shown in FIG. 25, there is no inconsistency in the result of determining whether or not there is a difference between images. Therefore, the possibility determination unit 2036 determines that there is a low possibility of an error of a result of determining whether or not there is a difference between the time-series images 2500-1 to 2500-3. The possibility determination unit 2036 records information indicating that there is a low possibility of the error of the result of determining whether or not there is a difference between the time-series images in the storage unit 2037. The possibility determination unit 2036 outputs the information indicating that there is a low possibility of the error of the result of determining whether or not there is a difference between the time-series images to the outside of the image difference determination device 2030.

The possibility determination unit 2036 determines that it is impossible to determine a possibility of the error of the result of determining whether or not there is a difference between the time-series images is less than the threshold value when it is determined that there are differences between all images adjacent in the time series. The possibility determination unit 2036 determines that it is impossible to determine a possibility of the error of the result of determining whether or not there is a difference between the time-series images even when it is determined that there is a difference between images that are not adjacent in the time series when there are differences between all images adjacent in the time series.

In the example shown in FIG. 26, the difference determination unit 2035 determines that there is a difference between the images 2600-1 and 2600-2 adjacent in the time series. The difference determination unit 2035 determines that there is a difference between the image 2600-2 and the image 2600-3 adjacent in the time series. That is, the difference determination unit 2035 determines that there are differences between all the images adjacent in the time series. Therefore, the possibility determination unit 2036 determines that it is impossible to determine the possibility of the error of the result of determining whether or not there is a difference between the time-series images 2600-1 to 2600-3. The possibility determination unit 2036 records information indicating that it is impossible to determine the possibility of the error of the result of determining whether or not there is a difference between the time-series images in the storage unit 2037. The possibility determination unit 2036 outputs the information indicating that it is impossible to determine the possibility of the error of the result of determining whether or not there is a difference between the time-series images to the outside of the image difference determination device 2030.

Returning to FIG. 20, the description of the configuration of the image difference determination device 2030 will be continued. The storage unit 2037 includes a storage device having a nonvolatile recording medium (a non-transitory recording medium) such as a magnetic hard disk device or a semiconductor storage device. The storage unit 2037 stores a determination data table. The storage unit 2037 stores a determination result from the difference determination unit 2035.

The storage unit 2037 stores information indicating the possibility of the error of the determination result. For example, the storage unit 2037 stores information indicating that the possibility of the error of the result of determining whether or not there is a difference between time-series images is less than the threshold value. For example, the storage unit 2037 stores information indicating that the possibility of the error of the result of determining whether or not there is a difference between time-series images is greater than the threshold value. For example, the storage unit 2037 stores information indicating that it is impossible to determine the possibility of the error of the result of determining whether or not there is a difference between time-series images.

Figure 28:
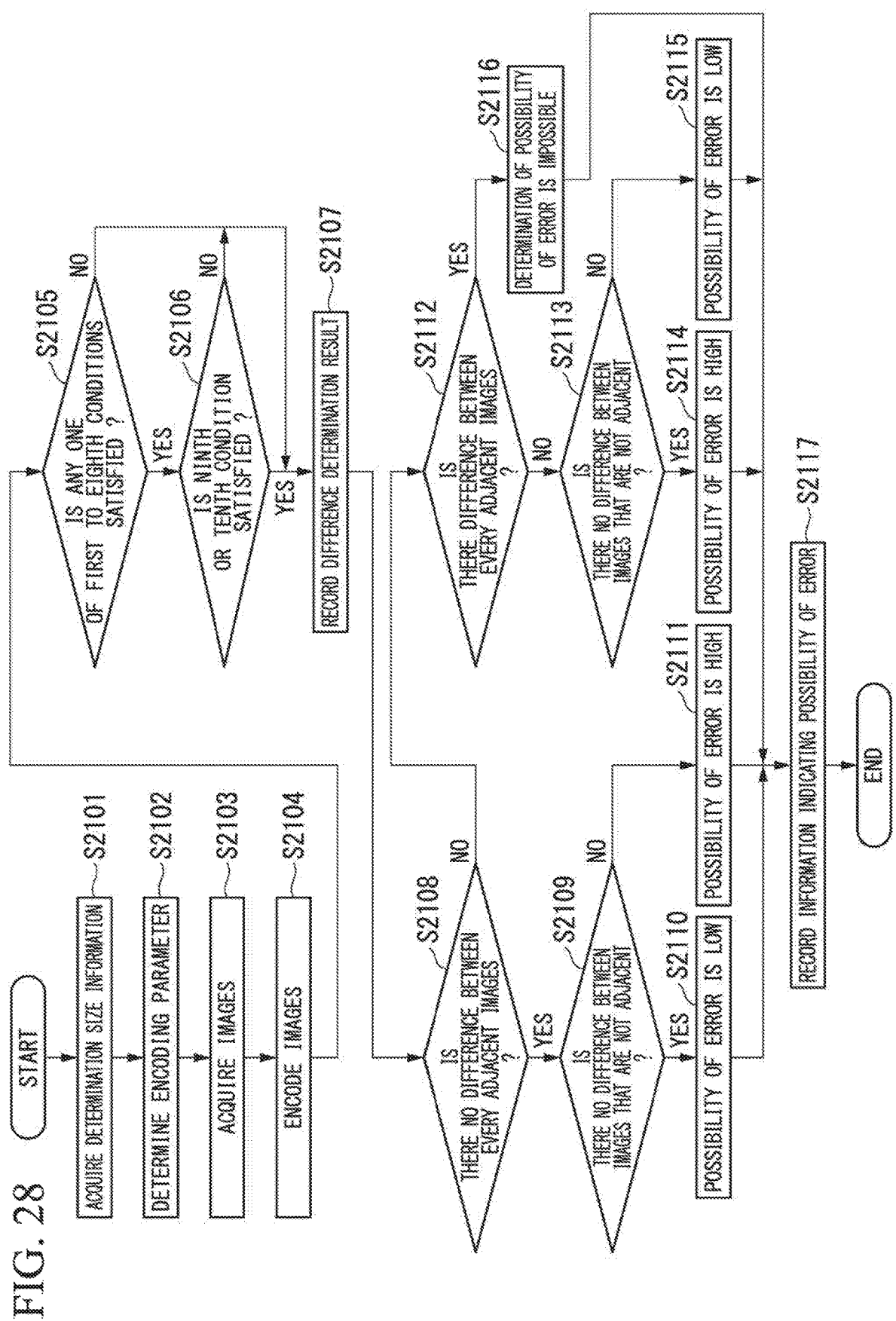
FIG. 28 is a flowchart showing an example of an operation of the image difference determination system in the sixth embodiment.

FIG. 28 is a flowchart showing an example of an operation of the image difference determination system 2001. The size acquisition unit 2031 obtains determination size information (step S2101). The parameter determination unit 2032 at least determines an encoding parameter, such as an encoding size, on the basis of a determination size (step S2102). The image acquisition unit 2033 acquires time-series images from the database 2020 (step S2103). The encoding unit 2034 encodes the time-series images (step S2104).

The difference determination unit 2035 determines whether the relationship between the amount of coding bits of a region of an object LCU and the amount of coding bits of a region of an adjacent LCU satisfies any one of the first to eighth conditions (step S2105). When the relationship between the amount of coding bits of the region of the object LCU and the amount of coding bits of the region of the adjacent LCU does not satisfy any one of the first to eighth conditions (step S2105: NO), the difference determination unit 2035 moves the process to step S2107 in which a determination result indicating that it has been determined that there is no difference between the small image of the region of the object LCU and the small image of the region of the adjacent LCU is recorded in the storage unit 2037.

When the relationship between the amount of coding bits of the region of the object LCU and the amount of coding bits of the region of the adjacent LCU satisfies any one of the first to eighth conditions (step S2105: YES), the difference determination unit 2035 determines whether or not the relationship between the amount of coding bits of the region of the object LCU and the amount of coding bits of the region of the same position LCU satisfies the ninth condition or the tenth condition (step S2106).

When the relationship between the amount of coding bits of the region of the object LCU and the amount of coding bits of the region of the same position LCU does not satisfy either one of the ninth condition and the tenth condition (step S2106: NO), the difference determination unit 2035 records the determination result indicating that it has been determined that there is no difference between a small image of the region of the object LCU and a small image of the region of the same position LCU in the storage unit 2037.

When the relationship between the amount of coding bits of the region of the object LCU and the amount of coding bits of the region of the same position LCU satisfies the ninth condition or the tenth condition (step S2106: YES), the difference determination unit 2035 records a determination result indicating that there is a difference between the small image of the region of the object LCU and the small image of the region of the same position LCU in the storage unit 2037. In the sixth embodiment, the difference determination unit 2035 determined that a reference image for which it is determined that there is a difference between the small image of the region of the object image and the small image of the region of the reference image is a reference image different from the object image (step S2107). Operations from step S2105 to step S2107 are performed for each of the regions (the object LCUs) in object images selected sequentially from the time-series images.

The possibility determination unit 2036 determines whether or not a difference between any images adjacent in the time series is absent (step S2108). When a difference between any images adjacent in the time series is absent (step S2108: YES), the possibility determination unit 2036 determines whether or not a difference between images that are not adjacent in the time series is absent (step S2109). When a difference between images that are not adjacent in the time series is absent (step S2109: YES), the possibility determination unit 2036 determines that a possibility of an error of the result of determining whether or not there is a difference between the time-series images is less than the threshold value (step S2110). When a difference between images that are not adjacent in the time series is present (step S2109: NO), the possibility determination unit 2036 determines that the possibility of the error of the result of determining whether or not there is a difference between the time-series images is greater than the threshold value (step S2111).

When a difference between any images adjacent in the time series is present (step S2108: NO), the possibility determination unit 2036 determines whether or not there is a difference between any images adjacent in the time series (step S2112). When there is no difference between any images adjacent in the time series (step S2112: NO), the possibility determination unit 2036 determines whether or not a difference between images that are not adjacent in the time series is absent (step S2113). When a difference between any images that are not adjacent in the time series is absent (step S2113: YES), the possibility determination unit 2036 determines that a possibility of an error of the result of determining whether or not there is a difference between the time-series images is greater than the threshold value (step S2114). When a difference between images which are not adjacent in the time series is present (step S2113: NO), the possibility determination unit 2036 determines that a possibility of an error of the result of determining whether or not there is a difference between the time-series images is less than the threshold value (step S2115).

When there are differences between all images adjacent in the time series (step S2112: YES), the possibility determination unit 2036 determines that it is impossible to determine the possibility of the error of the result of determining whether or not there is a difference between the time-series images (step S2116). The possibility determination unit 2036 records information indicating the possibility of the error of the determination result in the storage unit 2037 (step S2117).

As described above, the image difference determination device 2030 of the sixth embodiment includes the possibility determination unit 2036. The possibility determination unit 2036 acquires a result of determining whether or not there is a difference between time-series images as a determination result acquisition unit that acquires the determination result. When there is no difference between any images adjacent in the time series among the time-series images, the possibility determination unit 2036 determines the possibility of an error of the determination result on the basis of whether or not there is an inconsistency in the determination result. Thereby, the image difference determination device 2030 of the sixth embodiment can determine the possibility of the error of the result of determining whether or not there is a difference between time-series images.

Also, the possibility determination unit 2036 may select some of four or more time-series images as images to be determined. For example, when there are four or more time-series images, the possibility determination unit 2036 may determine a possibility of an error of a result of determining whether or not there is a difference between the time-series images with respect to differences between three images selected from the time-series images. Also, the difference determination unit 2035 may proceed to step S2112 after step S2107 shown in FIG. 28.

Seventh Embodiment

A seventh embodiment is different from the sixth embodiment in that a possibility determination unit 2036 determines a possibility of an error of a result of determining whether or not there is a difference between small images. In the seventh embodiment, only differences from the sixth embodiment will be described.

The difference determination unit 2035 shown in FIG. 20 determines whether or not there is a difference between small images of regions of images adjacent in the time series for each region of the image. The difference determination unit 2035 further determines whether or not there is a difference between the small images of the regions of the images that are not adjacent in the time series.

Figure 29:
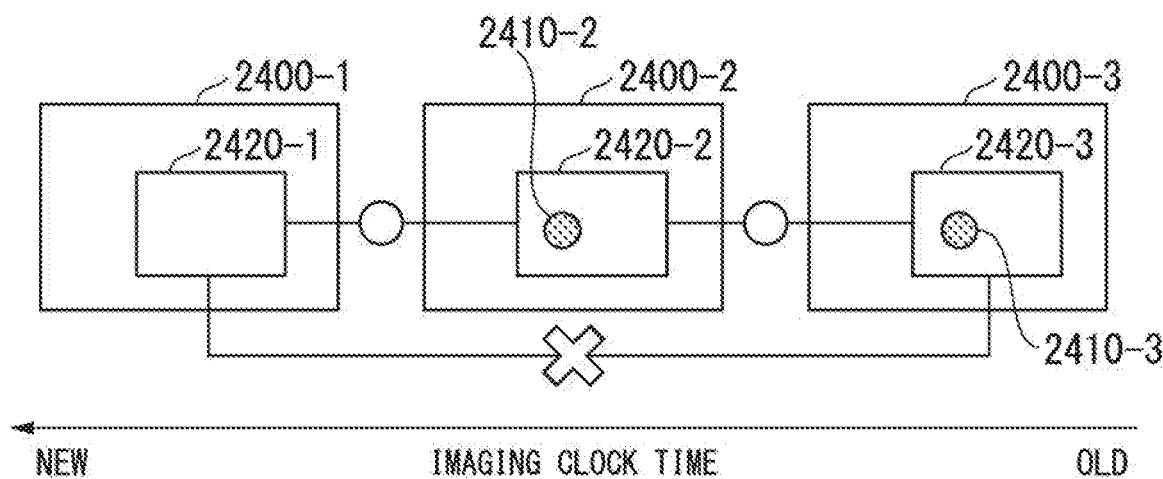
FIG. 29 is a diagram showing an example of time-series images in a seventh embodiment.

FIG. 29 is a diagram showing an example of time-series images in the seventh embodiment. FIG. 29 is a diagram corresponding to FIG. 24 of the sixth embodiment. In FIG. 29, images 2400 encoded by the encoding unit 2034 are schematically represented using images 2400 before encoding is performed. The image 2400 includes a region 2420. An image 2400-2 includes a subject image 2410-2 in a region 2420-2. An image 2400-3 includes a subject image 2410-3 in a region 2420-3.

In the example shown in FIG. 29, the difference determination unit 2035 determines that there is no difference between a small image of a region 2420-1 of an image 2400-1 selected as an object image and a small image of the region 2420-2 of the image 2400-2 that is a reference image. A circle mark between the images in FIG. 29 indicates that it has been determined that there is no difference between the small images. The difference determination unit 2035 determines that there is no difference between the small image of the region 2420-2 of the image 2400-2 selected as an object image and a small image of the region 2420-3 of the image 2400-3 that is a reference image. The difference determination unit 2035 determines that there is a difference between the small image of the region 2420-1 of the image 2400-1 selected as an object image and the small image of the region 2420-3 of the image 2400-3 that is the reference image with respect to the images 2400-1 and 2400-3 at both ends of the time series. A cross mark between the images in FIG. 29 indicates that it has been determined that there is a difference between the small images.

Returning to FIG. 20, the description of the configuration of the image difference determination device 2030 will be continued. When there is no difference between the small images of regions of any images adjacent in the time series, the possibility determination unit 2036 determines a possibility of an error of a result of determining whether or not there is a difference between the small images of the regions of the time-series images (a small-image determination result).

In the example shown in FIG. 29, the difference determination unit 2035 determines that there is a difference between the small image of the region 2420-1 and the small image of the region 2420-2 with respect to the image 2400-1 and the image 2400-2 adjacent in the time series. The difference determination unit 2035 determines that there is no difference between the small image of the region 2420-2 and the small image of the region 2420-3 with respect to the image 2400-2 and the image 2400-3 adjacent in the time series. On the other hand, the difference determination unit 2035 determines that there is a difference between the small image of the region 2420-1 and the small image of the region 2420-3 with respect to the images 2400-1 and 2400-3 that are not adjacent in the time series. In the example shown in FIG. 29, there is an inconsistency in the result of determining whether or not there is a difference between small images. Therefore, the possibility determination unit 2036 determines that there is a high possibility of an error of a result of determining whether or not there is a difference between the small images of the regions of the time-series images 2400-1 to 2400-3.

The possibility determination unit 2036 records information indicating that there is a high possibility of the error of the result of determining whether or not there is a difference between small images of the regions of the time-series images in the storage unit 2037. The possibility determination unit 2036 outputs information indicating that there is a high possibility of the error of the result of determining whether or not there is a difference between the small images of the regions of the time-series images to the outside of the image difference determination device 2030. Even when a region is included in each of the images of FIGS. 21, 22, 23, 25, and 26, the possibility determination unit 2036 similarly determines a possibility of an error of a result of determining whether or not there is a difference between small images.

As described above, the possibility determination unit 2036 of the seventh embodiment acquires a small-image determination result that is a result of determining whether or not there is a difference between small images of regions of time-series images as a determination result acquisition unit that acquires the determination result. When there is no difference between the small images of the regions of any images adjacent in the time series among the time-series images, the possibility determination unit 2036 determines a possibility of an error of the small-image determination result on the basis of whether or not there is an inconsistency in the small-image determination result. Thereby, the image difference determination device 2030 of the seventh embodiment can determine the possibility of the error of the result of determining whether or not there is a difference between the small images of the regions of the time-series images.

In Patent Document 1, a device that determines whether or not there is a difference between time-series images in which substantially the same spatial region is imaged is disclosed. When there is no difference between any images adjacent in the time series among time-series images, a result of determining whether or not there is a difference between the time-series images may be erroneous. However, the above-described device has a problem that it is impossible to determine the possibility of the error of the result of determining whether or not there is a difference between time-series images. On the other hand, the image difference determination devices 2030 of the sixth and seventh embodiments can determine the possibility of the error of the result of determining whether or not there is a difference between time-series images when there is no difference between any images adjacent in the time series.

Also, at least a part of the image difference determination device or the change period estimation device in the above-described embodiments may be configured to be implemented by a computer. In this case, a function thereof may be implemented by recording a program for implementing the functions on a computer-readable recording medium and causing a computer system to read and execute the program recorded on the recording medium. Also, the "computer system" described here is assumed to include an operating system (OS) and hardware such as peripheral devices. Also, the "computer-readable recording medium" refers to a storage device including a flexible disk, a magneto-optical disc, a read only memory (ROM), a portable medium such as a compact disc (CD)-ROM, and a hard disk embedded in the computer system. Further, the "computer-readable recording medium" may include a computer-readable recording medium for dynamically holding a program for a short time as in a communication line when the program is transmitted via a network such as the Internet or a communication circuit such as a telephone circuit and a computer-readable recording medium for holding the program for a predetermined time as in a volatile memory inside the computer system including a server and a client when the program is transmitted. The above-described program may be used to implement some of the above-described functions. Further, the program may implement the above-described functions in combination with a program already recorded on the computer system and implement the above-described functions using a programmable logic device such as a field programmable gate array (FPGA).

Although the embodiments of the present invention have been described above in detail with reference to the drawings, the specific configuration is not limited to the embodiments and other designs and the like may also be included without departing from the scope of the present invention.

For example, a change detection method for use in the present invention is not limited to the change detection method disclosed in the above-described embodiment and a conventional change detection method of comparing image feature quantities or pixel values or the like may be used.

INDUSTRIAL APPLICABILITY

The present invention can be applied to fields required to determine a type of change to which a difference between time-series images belongs in a spatial region photographed in the time-series images.

REFERENCE SIGNS LIST 1, 1001, 2001 Image difference determination system
10, 1010, 2010 Image storage device
20, 1020, 2020 Database
30, 1030, 2030 Image difference determination device
31, 1031, 2031 Size acquisition unit
32, 1032, 2032 Parameter determination unit
33, 1033, 2033 Image acquisition unit
34, 1034, 2034 Encoding unit
35, 2035 Difference determination unit
36 Speed determination unit
37, 1037, 2037 Storage unit
100 Image
110 Subject image
120 Region
200 Image
210 Subject image
220 Region
300 Image
310 Subject image
320 Region
400 Image
410 Subject image
420 Region
1035 First difference determination unit
1036 Second difference determination unit
1038 Removal unit
1100 Image
1200 Image
1300 Image
1310 Region
1320 Region
1400 Image
1500 Image
2036 Possibility determination unit
2100 Image
2200 Image
2210 Subject image
2300 Image
2310 Subject image
2400 Image
2410 Subject image
2420 Region
2500 Image
2510 Subject image
2600 Image
2610 Subject image

The invention claimed is:

1. An image difference determination device comprising:
a determination result acquisition unit configured to acquire a result of determining whether or not there is a difference between an object image selected from time-series images and each of reference images that are images other than the object image among the time-series images; and
a temporary difference determination unit configured to determine whether or not the object image is an image having a temporary difference on a basis of a result of comparing the number of reference images among the time-series images determined to have differences from the object image with the number of reference images among the time-series images determined not to have differences from the object image,
wherein the temporary difference determination unit is configured to designate a ratio of the number of reference images among the time-series images determined to have the differences from the object image to a total number of the reference images that are the images other than the object image among the time-series images as the comparison result.

2. The image difference determination device according to claim 1, further comprising a removal unit configured to remove the image having the temporary difference from the time-series images on a basis of a magnitude relationship between the ratio and a threshold value.

3. The image difference determination device according to claim 1, further comprising a first difference determination unit configured to determine whether or not there is a difference between the object image and each of the reference images.

4. An image difference determination method to be executed by an image difference determination device for determining whether or not there is a temporary difference between images, the image difference determination method comprising the steps of:
acquiring a result of determining whether or not there is a difference between an object image selected from time-series images and each of reference images that are images other than the object image among the time-series images; and
determining whether or not the object image has a temporary difference on a basis of a result of comparing the number of reference images among the time-series image determined to have differences from the object image with the number of reference images among the time-series image determined not to have differences from the object image, wherein a ratio of the number of reference images among the time-series images determined to have the differences from the object image to a total number of the reference images that are the images other than the object image among the time-series images is designated as the comparison result.

5. A non-transitory computer-readable medium storing a program for causing a computer to function as the image difference determination device according to claim 1.

\* \* \* \* \*